(12) United States Patent
Klein

(10) Patent No.: US 12,038,862 B2
(45) Date of Patent: Jul. 16, 2024

(54) APPARATUSES AND METHODS FOR SELECTIVE COMMUNICATION THROUGH A MEMORY CONNECTOR

(71) Applicant: Micron Technology, Inc., Boise, ID (US)

(72) Inventor: Dean A. Klein, Eagle, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/321,196

(22) Filed: May 14, 2021

(65) Prior Publication Data

US 2021/0271624 A1    Sep. 2, 2021

Related U.S. Application Data

(60) Continuation of application No. 16/547,375, filed on Aug. 21, 2019, now Pat. No. 11,042,498, which is a continuation of application No. 15/794,563, filed on Oct. 26, 2017, now Pat. No. 10,417,165, which is a division of application No. 14/341,262, filed on Jul. 25, 2014, now Pat. No. 9,804,989.

(51) Int. Cl.
*G06F 13/40* (2006.01)
*G06F 13/42* (2006.01)

(52) U.S. Cl.
CPC ...... *G06F 13/4221* (2013.01); *G06F 13/4022* (2013.01); *G06F 13/4068* (2013.01)

(58) Field of Classification Search
None
See application file for complete search history.

(56) References Cited

U.S. PATENT DOCUMENTS

| | | |
|---|---|---|
| 6,401,157 B1 | 6/2002 | Nguyen et al. |
| 7,747,933 B2 | 6/2010 | Johnson |
| 8,074,159 B2 | 12/2011 | Johnson |
| 8,225,019 B2 | 7/2012 | Asnaashari |
| 8,296,639 B2 | 10/2012 | Johnson |
| 8,456,830 B2 | 6/2013 | Sun et al. |
| 8,489,975 B2 | 7/2013 | Johnson |
| 8,582,388 B1 | 11/2013 | Hu et al. |
| 8,625,269 B2 | 1/2014 | Chen et al. |
| 8,625,303 B2 | 1/2014 | Yin et al. |
| 8,964,485 B2 * | 2/2015 | Yang ................. G11C 7/12 365/207 |
| 9,251,047 B1 | 2/2016 | Mckelvie et al. |
| 9,558,135 B2 | 1/2017 | Jones et al. |

(Continued)

*Primary Examiner* — Elias Mamo
(74) *Attorney, Agent, or Firm* — TraskBritt

(57) ABSTRACT

Apparatuses and methods for selective communication through a memory connector via switching circuitry. An apparatus includes a memory connector, a memory bus corresponding to a memory protocol, one or more communication buses corresponding to one or more communication protocols, and switching circuitry operably coupled between the memory connector and the memory bus and the one or more communication buses. The one or more communication protocols are different from the memory protocol. The switching circuitry is configured to selectively operably couple any one of the memory bus and the one or more communication buses to the memory connector to enable communication through the memory connector using any one of the memory protocol or the one or more communication protocols.

20 Claims, 15 Drawing Sheets

(56) References Cited

U.S. PATENT DOCUMENTS

| | | |
|---|---|---|
| 2003/0116624 A1 | 6/2003 | Chen |
| 2003/0229748 A1* | 12/2003 | Brewer ................ G06F 13/385 |
| | | 710/305 |
| 2008/0022018 A1 | 1/2008 | Konno et al. |
| 2008/0059687 A1* | 3/2008 | Mayer ................ G06F 13/4022 |
| | | 710/317 |
| 2008/0288698 A1 | 11/2008 | Lin et al. |
| 2011/0099317 A1* | 4/2011 | Nishtala .................. G11C 5/04 |
| | | 710/316 |
| 2011/0125932 A1 | 5/2011 | Oh et al. |
| 2012/0092044 A1 | 4/2012 | Lien |
| 2012/0166701 A1 | 6/2012 | Oh et al. |
| 2012/0297132 A1* | 11/2012 | Tian .................... G06F 13/4022 |
| | | 711/E12.001 |
| 2012/0320538 A1 | 12/2012 | Wu et al. |
| 2013/0067156 A1* | 3/2013 | Cho ........................ G06F 13/28 |
| | | 711/E12.001 |
| 2013/0086311 A1 | 4/2013 | Huang et al. |
| 2013/0128446 A1 | 5/2013 | Yin et al. |
| 2013/0304942 A1 | 11/2013 | Golembeski et al. |
| 2013/0305128 A1 | 11/2013 | Johnson |
| 2014/0099815 A1 | 4/2014 | Foster et al. |
| 2014/0122833 A1 | 5/2014 | Davis et al. |
| 2014/0211351 A1 | 7/2014 | Shoykhet et al. |
| 2014/0281681 A1* | 9/2014 | Cordero ................ G06F 11/073 |
| | | 714/6.3 |
| 2014/0286434 A1 | 9/2014 | Lee et al. |
| 2014/0337540 A1 | 11/2014 | Johnson et al. |
| 2015/0301970 A1* | 10/2015 | Armstead ........... G06F 13/4022 |
| | | 710/105 |
| 2016/0026596 A1 | 1/2016 | Klein |

\* cited by examiner

APPARATUSES AND METHODS FOR SELECTIVE COMMUNICATION THROUGH A MEMORY CONNECTOR

CROSS-REFERENCE TO RELATED APPLICATIONS

This application is a continuation of U.S. patent application Ser. No. 16/547,375, filed Aug. 21, 2019, now U.S. Pat. 11,042,498, issued Jun. 22, 2021, which is a continuation of U.S. patent application Ser. No. 15/794,563, filed Oct. 26, 2017, now U.S. Pat. 10,417,165, issued Sep. 17, 2019, which is a divisional of U.S. patent application Ser. No. 14/341,262, filed Jul. 25, 2014, now U.S. Pat. No. 9,804,989, issued Oct. 31, 2017, the disclosure of each of which is hereby incorporated herein in its entirety by this reference.

FIELD

The present disclosure relates generally to electrical interfaces. More specifically, the present disclosure relates to interfaces between components on computer interface boards.

BACKGROUND

Modern computers often include a computer interface board (e.g., a motherboard, logic board, system board, etc.) to interface different components (e.g., central processing units, chipsets, memory, storage, video cards, sound cards, network cards, etc.) of the computer together. A computer interface board also includes various connectors, brackets, and cables for connecting the components to the computer interface board. For example, a computer interface board often includes dual in-line memory module (DIMM) sockets (e.g., DDR3 sockets, DDR4 sockets, etc.), serial advanced technology attachment (SATA) connectors and cables, peripheral component interconnect express (PCIe) connectors and brackets, and various other interfaces.

Some of the various interfaces of a computer interface board are conventionally designed to interface with specific kinds of components. For example, DIMM sockets conventionally interface with memory devices (e.g., random access memory), SATA connectors and cables generally interface with storage devices (e.g., hard disk drives, solid state drives, optical drives, etc.), and PCIe connectors generally interface with graphics cards, storage devices, and various add-on peripherals.

A recent product, the ULLTRADIMM® solid state drive (SSD) (hereinafter "the ULLtraDIMM"), is a flash SSD that interfaces with the CPU through a DIMM socket. The ULLtraDIMM takes advantage of the DIMM form factor, which does not require extra cabling or brackets, unlike SATA and PCIe SSDs. Also, as DIMM sockets are typically located near the CPU and have direct access to the CPU, the ULLtraDIMM may enable low latency storage access.

As the ULLtraDIMM interfaces with the CPU through a DIMM socket, the ULLtraDIMM is coupled to the CPU's memory bus, which is specifically designed to interface with random access memory devices, not with flash storage. In order to enable communication between the ULLtraDIMM and the CPU over the memory bus, the ULLtraDIMM includes a controller that can communicate with the CPU over the memory bus, and can communicate with SSD controllers within the ULLtraDIMM using a SATA protocol.

Although the ULLtraDIMM internally utilizes a SATA protocol, the internal SATA interface is isolated from the computer interface board. As a result, some standard features of the SATA protocol may be unavailable to the ULLtraDIMM. For example, the ULLtraDIMM may not be able to transfer stored data into system memory where it can be operated on by the CPU (i.e., direct memory access (DMA), which is standard to SATA, PCIe, and SAS protocols). Instead, the CPU transfers the data from the ULLtraDIMM SSD to the system memory through programmed input/output (PIO), and system efficiency is compromised thereby. As another example, the ULLtraDIMM may not be able to send interrupt messages to the CPU (the memory bus has no interrupt capability) so the CPU may not be able to be directly summoned to attend to the SSD. As a result, the CPU may not be able to work on other tasks (threads) while waiting for a drive to retrieve and correct its data, and system efficiency is further compromised.

Furthermore, in order to make the ULLtraDIMM visible to the CPU after a system boot, the computer system's initializing software (e.g., basic input/output system (BIOS) software) would probably need to be modified. Also, after booting, special non-standard drivers may need to be loaded to enable the CPU to access the ULLtraDIMM as an SSD over the memory bus.

DETAILED DESCRIPTION

Figure 1:
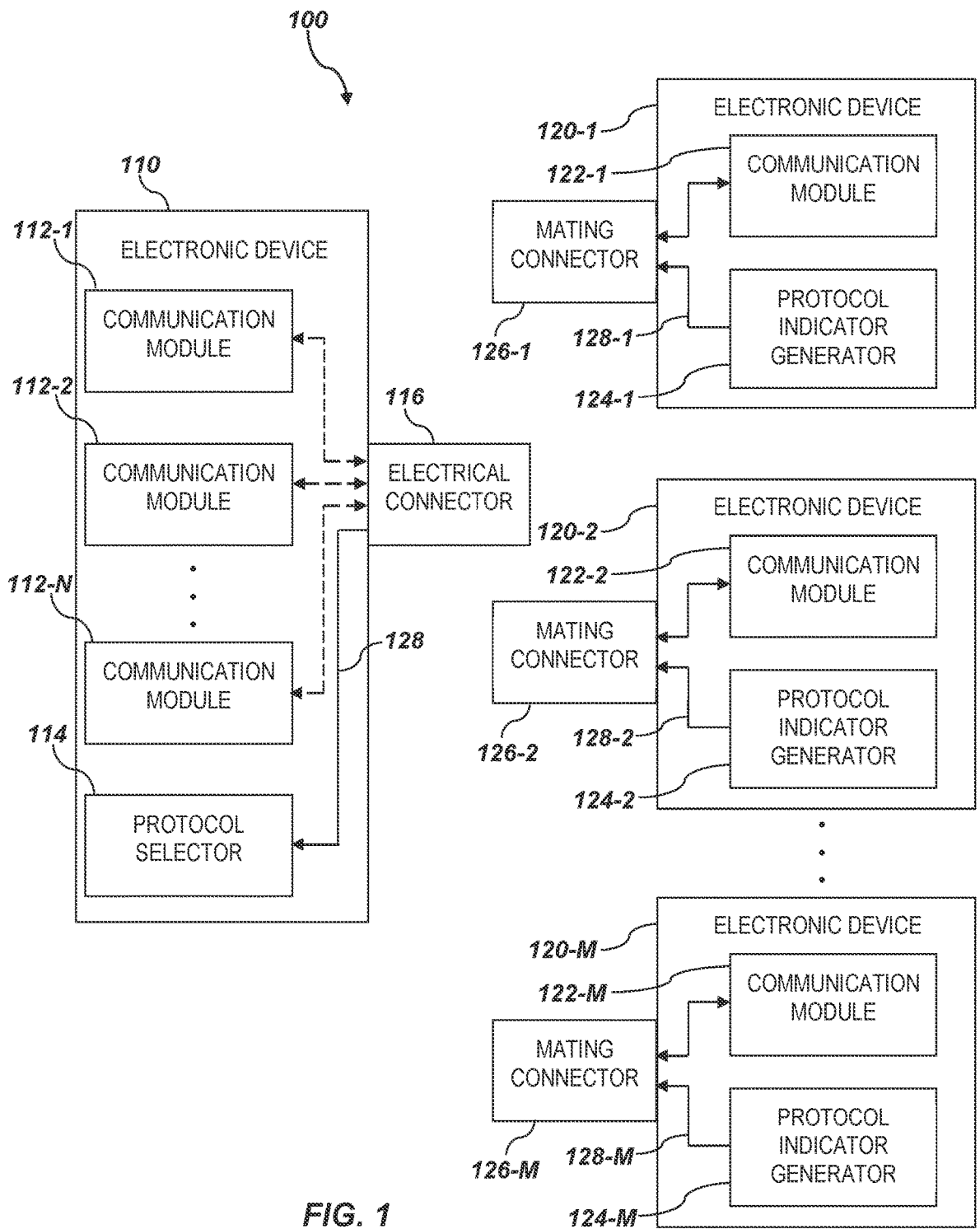
FIG. 1 is a simplified block diagram of an electrical system.

In the following detailed description, reference is made to the accompanying drawings which form a part hereof, and in which is shown by way of illustration specific embodiments in which the present disclosure may be practiced. These embodiments are described in sufficient detail to enable those of ordinary skill in the art to practice the present disclosure. It should be understood, however, that the detailed description and the specific examples, while indicating examples of embodiments of the present disclosure, are given by way of illustration only and not by way of limitation. From this disclosure, various substitutions, modifications, additions rearrangements, or combinations thereof within the scope of the present disclosure may be made and will become apparent to those of ordinary skill in the art.

In accordance with common practice, the various features illustrated in the drawings may not be drawn to scale. The illustrations presented herein are not meant to be actual views of any particular apparatus (e.g., device, system, etc.) or method, but are merely idealized representations that are employed to describe various embodiments of the present disclosure. Accordingly, the dimensions of the various features may be arbitrarily expanded or reduced for clarity. In addition, some of the drawings may be simplified for clarity. Thus, the drawings may not depict all of the components of a given apparatus or all operations of a particular method.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal for clarity of presentation and description. It should be understood by a person of ordinary skill in the art that the signal may represent a bus of signals, wherein the bus may have a variety of bit widths and the present disclosure may be implemented on any number of data signals including a single data signal.

The various illustrative logical blocks, modules, circuits, and algorithm acts described in connection with embodiments disclosed herein may be implemented as electronic hardware, computer software, or combinations of both. To clearly illustrate this interchangeability of hardware and software, various illustrative components, blocks, modules, circuits, and acts are described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the embodiments of the disclosure described herein.

In addition, it is noted that the embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be rearranged. A process may correspond to a method, a function, a procedure, a subroutine, a subprogram, etc. Furthermore, the methods disclosed herein may be implemented in hardware, software, or both. If implemented in software, the functions may be stored or transmitted as one or more computer-readable instructions (e.g., software code) on a computer-readable medium. Computer-readable media may include both computer storage media and communication media including any medium that facilitates transfer of a computer program from one place to another. Computer-readable media may include volatile and non-volatile memory, such as, for example, magnetic and optical storage devices, such as, for example, hard drives, disk drives, magnetic tapes, CDs (compact discs), DVDs (digital versatile discs or digital video discs), solid state storage devices (solid state drives), and other similar storage devices.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part, element number indicators begin with the number of the drawing on which the elements are introduced or most fully discussed. Thus, for example, element identifiers on a FIG. 1 will be mostly in the numerical format 1xx and elements on a FIG. 3 will be mostly in the numerical format 3xx.

As used herein, the term "memory" refers generally to volatile data storage. For example, memory includes random access memory (RAM) devices, such as dynamic RAM (DRAM). A common form of DRAM that is referenced in the present disclosure is double data rate synchronous DRAM (DDR SDRAM). Accordingly, the terms "memory socket" and "memory sockets" refer to electrical connectors that are configured to interface with memory devices having a memory module form factor (e.g., a dual in-line memory module (DIMM) form factor). Also, the term "memory protocol" refers to a communication protocol that is used for communicating with memory devices (e.g., a DDR SDRAM protocol).

As used herein, the terms "DDR SDRAM" (double data rate synchronous DRAM) and "DDR" refer to a class of memory that the JEDEC Solid State Technology Association (hereinafter referred to simply as "JEDEC") currently defines standards for. The most widely used version of DDR SDRAM is currently DDR3 SDRAM. The release of DDR4 SDRAM to market, however, is expected soon. The different existing versions of DDR SDRAM (DDR1, DDR2, DDR3, DDR4) are not necessarily forward, nor backward compatible with each other. Also, some of the existing versions of DDR SDRAM are implemented with different form factors (i.e., DIMMs) from the others. The terms "DDR SDRAM" and "DDR," however, refer generically to any of the different existing versions of DDR SDRAM, and any versions that may yet be released, unless explicitly indicated otherwise.

As used herein, the term "DIMM" refers to an electronic device implemented in a form factor generally used for memory devices. For example, a DIMM may include a device implemented in a DDR SDRAM form factor. Also, a DIMM may also include electronic devices implemented with other memory form factors (e.g., SO-DIMM, Mini-DIMM, VLP Mini-DIMM, RDIMM, etc.). Accordingly, the term "DIMM socket" refers to any socket configured to interface with any DIMM implemented using one of the various DIMM form factors. A DIMM socket is not, therefore, limited to a socket configured to interface with electronic devices implemented with any particular DDR version form factor, nor to DDR form factors in general, unless explicitly indicated otherwise.

As used herein, the term "storage," in contrast to "memory," refers to non-volatile data storage. Storage includes read-only memory (ROM), and various types of non-volatile storage, such as, for example, Flash (e.g., solid state drives (SSDs), NAND FLASH, memory cards, etc.), hard disks, optical drives, etc.

As used herein, the term "computer interface board" refers to a substrate or other structure such as, by way of non-limited example, a printed circuit board (PCB) that is configured to be populated by control circuitry for a computer system. For example, a computer interface board may include a motherboard, a logic board, a system board, and other interface board configurations, implementation of embodiments of the disclosure not being constrained to a particular physical configuration.

As used herein, the terms "chip" and "chips" refer to electronic devices implemented on semiconductor dies (e.g., integrated circuits).

Systems, devices, and methods of the present disclosure include systems, devices and methods for selectively communicating through an electrical connector using a particular communication protocol of a plurality of different communication protocols. Although the present disclosure is discussed primarily with reference to computer interface boards, the present disclosure is not so limiting. Rather, the systems and methods of the present disclosure may be implemented in any environment where selectively communicating through an electrical connector using different communication protocols would be helpful or desirable.

FIG. 1 is a simplified block diagram of an electrical system 100. The electrical system 100 may include an electronic device 110 and any of a plurality of different electronic devices 120-1, 120-2, . . . 120-M (sometimes referred to herein simply together as "electronic devices" 120, and individually as "electronic device" 120). The electronic device 110 may include an electrical connector 116. The electronic devices 120 may include mating connectors 126-1, 126-2, . . . 126-M (sometimes referred to herein simply together as "mating connectors" 126, and individually as "mating connector" 126) configured to mate with the electrical connector 116. The electronic device 110 may be configured to communicate with any of the electronic devices 120 that is connected to the electrical connector 116.

The electronic devices 120 may not all be configured for communication using the same communication protocol. For example, electronic device 120-1 may be configured to communicate using a first communication protocol, electronic device 120-2 may be configured to communicate using a second communication protocol, and electronic device 120-M may be configured to communicate using another communication protocol. Accordingly, electronic devices 120-1, 120-2, . . . and 120-M may include first communication module 122-1, second communication module 122-2, . . . and another communication module 122-M (sometimes referred herein simply together as "communication modules" 122, and individually as "communication module" 122), respectively.

When one of the electronic devices 120 is connected to the electrical connector 116 of the electronic device 110, the electronic device 120 may be configured to indicate to the electronic device 110 the appropriate communication protocol that the electronic device 110 should use to communicate with electronic device 120. Accordingly, the electronic devices 120 may each include a protocol indicator generator 124-1, 124-2, . . . 124-M (sometimes referred to herein simply together as "protocol indicator generators" 124 and individually as "protocol indicator generator" 124). The protocol indicator generator 124 may be configured to output protocol indicators 128-1, 128-2, . . . 128-M (sometimes referred to herein simply together as "protocol indicators" 128, and individually as "protocol indicator" 128) through the mating connectors 126 to the electronic device 110. The protocol indicators 128 may be configured to indicate to the electronic device 110 which communication protocol the respective electronic device 120 is configured to use. For example, protocol indicator 128-1 may be configured to indicate the first communication protocol corresponding to the first communication module 122-1. The protocol indicators 128-2, 128-M may similarly be configured to indicate the communication protocols corresponding to the second communication module 122-2 and communication protocol 122-M, respectively.

The electronic device 110 may be configured to selectively communicate using any of a plurality of different communication protocols through the electrical connector 116. Accordingly, the electronic device 110 may include a plurality of communication modules 112-1, 112-2, . . . 112-N (sometimes referred to herein simply together as "communication modules" 112, and individually as "communication module" 112). Each of the communication modules 112 may be configured to enable the electronic device 110 to communicate through the electrical connector 116 using a different one of the plurality of different communication protocols.

The electronic device 110 may also include a protocol selector 114 configured to determine which of the plurality of different communication protocols the electronic device 110 should use to communicate with through the electrical connector 116. For example, the protocol selector 114 may be configured to receive the protocol indicator 128 through the electrical connector 116 from any of the electronic devices 120. The electronic device 110 may be configured to communicate through the electrical connector 116 using the communication protocol indicated by the protocol indicator 128. As a result, the electronic device 110 may be configured to communicate with any of the electronic devices 120 that is coupled to the electrical connector 116, regardless of the communication protocol that the respective electronic device 120 is capable of communicating with (so long as the communication protocols the electronic devices 120 are configured to communicate with are supported by corresponding communication modules 112 of the electronic device 110).

Figure 2:
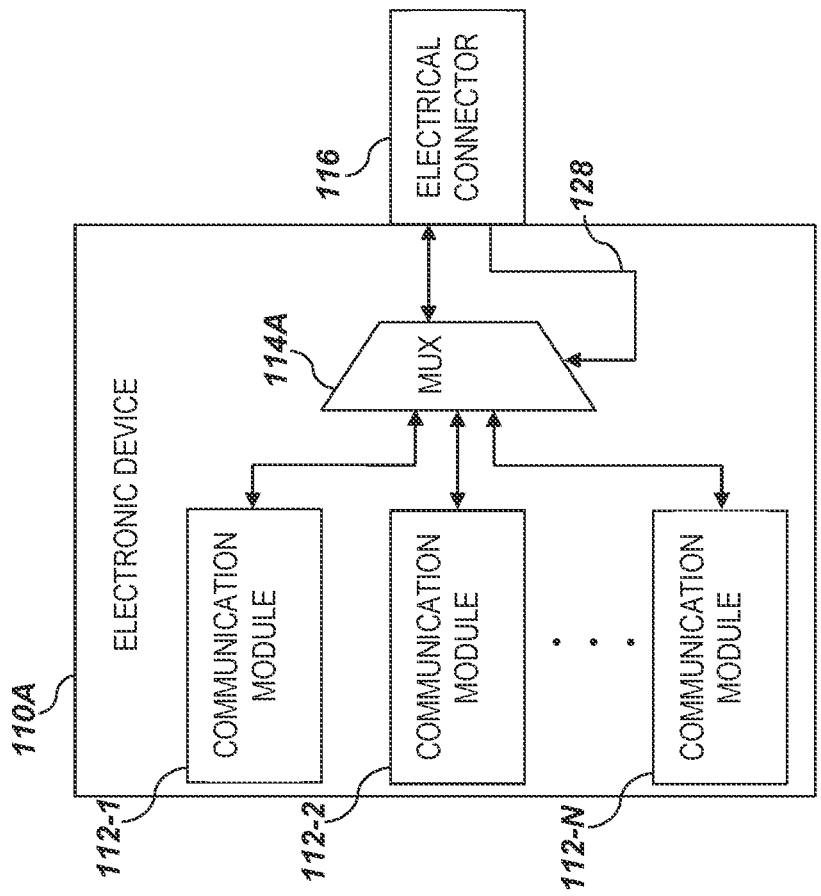
FIG. 2 is a simplified block diagram of an example of an electronic device of the electrical system of FIG. 1.

In some embodiments, the protocol selector 114 may include a switching device (e.g., a multiplexor, a field effect transistor (FET) switch, a relay, etc.) configured to operably couple one of the communication modules 112 that is configured to communicate using the protocol that is indicated by the protocol indicator 128 to at least some signal lines on the electrical connector 116, as illustrated in FIG. 2.

FIG. 2 is a simplified block diagram of an example of an electronic device 110A of the electrical system 100 of FIG. 1. The electronic device 110A may include a protocol selector 114A comprising a controllable switching device (e.g., a multiplexor, a field effect transistor (FET) switch, a relay, etc.). The protocol selector 114A may be configured to receive the protocol indicator 128 from an electronic device 120 (FIG. 1) through the electrical connector 116. The protocol selector 114A may also be configured to operably couple one of the communication modules 112 that corresponds to the particular communication protocol indicated by the protocol indicator 128 to the electrical connector 116. In other words, responsive to receiving the protocol indicator 128, the protocol selector 114A may be configured to close some switches (figuratively or literally) to conduct communication signals between a selected communication module 112 and the electrical connector 116 and open other switches to isolate communication signals between other communication modules 112 and the electrical connector 116.

Figure 3:
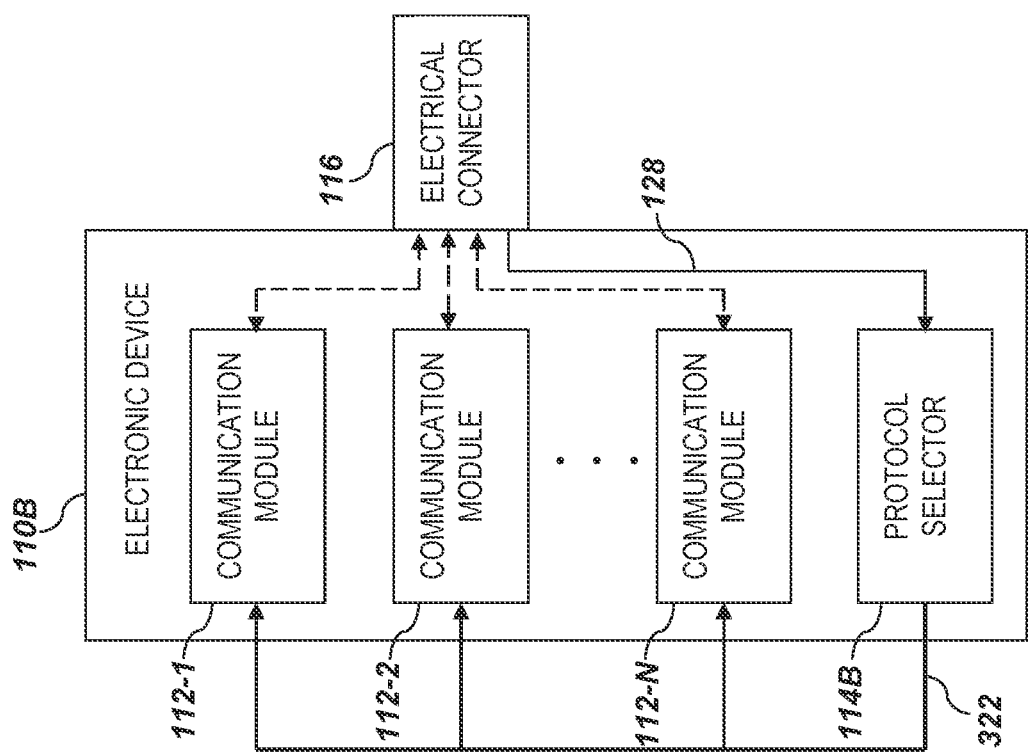
FIG. 3 is a simplified block diagram of another example of an electronic device of the electrical system of FIG. 1.

Referring again to FIG. 1, in some embodiments, the protocol selector 114 may include a protocol selector module configured to selectively enable and disable the communication modules 112 responsive to the protocol indicator 128, as illustrated in FIG. 3.

FIG. 3 is a simplified block diagram of another example of an electronic device 110B of the electrical system 100 of FIG. 1. The electronic device 110B may include communication modules 112 that are each operably coupled to the electrical connector 116. In some embodiments, the communication modules 112 may share some or all of the same pins of the electrical connector 116 with each other.

The electronic device 110B may also include a protocol selector 114B configured to selectively enable and disable the communication modules 112 responsive to the protocol indicator 128. For example, the protocol selector 114B may be configured to activate one of the communication modules 112 that corresponds to the communication protocol that is indicated by the protocol indicator 128, and disable the other communication modules 112. By way of non-limiting example, the protocol selector 114B may be configured to enable and disable the communication modules 112 using an enable/disable command bus 322.

In some embodiments, the protocol selector 114B may be implemented with software. In some embodiments, the protocol selector 114B may be implemented as hardware. In some embodiments, the protocol selector 114B may be implemented using a combination of hardware and software.

Referring again to FIG. 1, by way of non-limiting example, the electronic device 110 may comprise a computer interface board 410, as will be discussed in more detail below with reference to FIGS. 4, 5, and 10.

In some embodiments, an electrical system comprises an electronic device configured to communicate through a memory socket using one of a plurality of different communication protocols responsive to receiving an indication of the one of the plurality of different communication protocols through the memory socket from another electronic device.

In some embodiments, the electronic device may include a computer interface board comprising the memory socket and a central processing unit. In some embodiments, the computer interface board may further comprise a chipset programmed to receive the indication of the one of the plurality of different communication protocols and activate a communication module corresponding to the one of the plurality of different communication protocols.

In some embodiments, the memory socket may comprise a dual in-line memory module (DIMM) socket.

In some embodiments, the plurality of different communication protocols may comprise a serial advanced technology attachment (SATA) protocol, a peripheral component interconnect express (PCIe) protocol, and a memory protocol.

In some embodiments, the plurality of different communication protocols may comprise a serial advanced technology attachment (SATA) protocol and a memory protocol. In some embodiments, the plurality of different communication protocols may comprise a peripheral component interconnect express (PCIe) protocol and a memory protocol. In some embodiments, the plurality of different communication protocols may comprise a serial attached SCSI (SAS) protocol and a memory protocol. In some embodiments, the plurality of different communication protocols may comprise a serial advanced technology attachment (SATA) protocol, a peripheral component interconnect express (PCIe) protocol, and a memory protocol. In some embodiments, the plurality of different communication protocols may comprise a memory protocol and one or more communication protocols selected from the group consisting of a serial advanced technology attachment (SATA) protocol, a peripheral component interconnect express (PCIe) protocol, and a serial attached SCSI (SAS) protocol. In some embodiments, the plurality of different communication protocols may comprise two or more different types of memory interfaces. In some embodiments, the plurality of different communication protocols may comprise two or more different types of memory interfaces and one or more communication protocols selected from the group consisting of a serial advanced technology attachment (SATA) protocol, a peripheral component interconnect express (PCIe) protocol and a serial attached SCSI (SAS) protocol. In some embodiments, the plurality of different communication protocols may comprise at least one of a serial attached SCSI protocol and a QuickPath Interconnect (QPI) protocol.

In some embodiments, the electronic device may comprise a plurality of different communication modules. Each of the plurality of different communication modules may correspond to a different one of the plurality of different communication protocols. Each of the plurality of different communication modules may be operably coupled to a switching device. The switching device may be configured to receive the indication of the one of the plurality of different communication protocols. The switching device may also be configured to couple one of the plurality of different communication modules that corresponds to the one of the plurality of different communication protocols to the memory socket.

Figure 4:
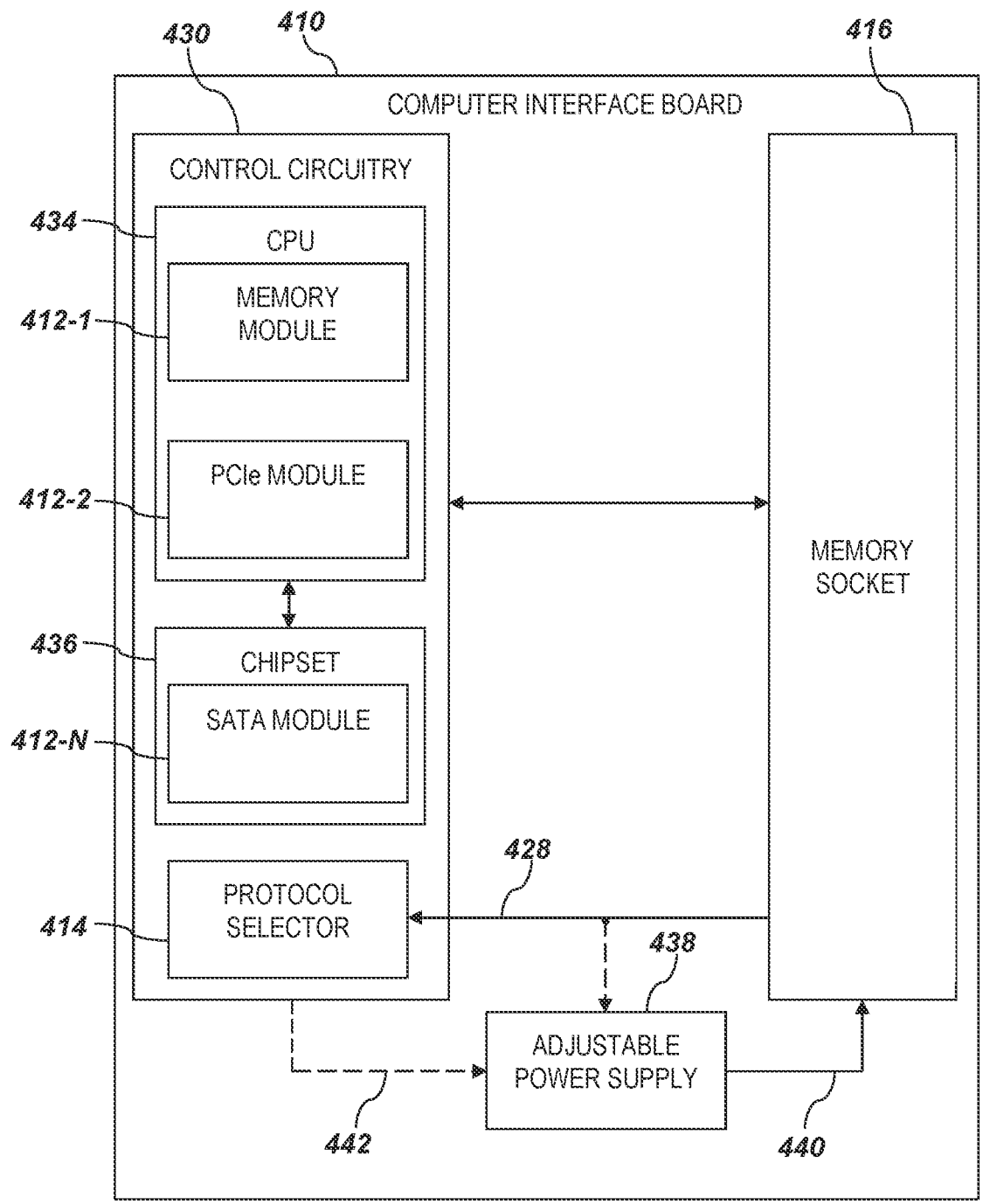
FIG. 4 is a simplified block diagram of a computer interface board.

FIG. 4 is a simplified block diagram of a computer interface board 410 showing an example of specific types of communication modules. The computer interface board 410 may include control circuitry 430 operably coupled to at least one memory socket 416 (sometimes referred to herein simply as "memory socket" 416). By way of non-limiting example, the memory socket 416 may include any of a DIMM socket, a single in-line memory module (SIMM) socket, and other memory connectors.

The control circuitry 430 may include one or more central processing units (CPU) 434 operably coupled to a chipset 436. The control circuitry 430 may also include a plurality of communication modules 412-1, 412-2, . . . 412-N (sometimes referred to herein simply together as "communication modules" 412, and individually as "communication module" 412) configured to enable the control circuitry 430 to communicate using a plurality of corresponding communication protocols. By way of non-limiting example, the control circuitry 430 may include a memory communication module 412-1 configured to enable the control circuitry to communicate using a memory protocol (e.g., a DDR SDRAM protocol or other memory protocol). Also by way of non-limiting example, the control circuitry 430 may include a PCIe communication module 412-2 configured to enable the control circuitry 430 to communicate using a PCIe protocol. As a further non-limiting example, the control circuitry 430 may include a SATA communication module 412-N configured to enable the control circuitry 430 to communicate using a SATA protocol. Although not illustrated in FIG. 4, the control circuitry 430 may also include other communication modules, such as, for example, a SAS communication module, a QuickPath Interconnect (QPI) communication module, or any other communication module.

The control circuitry 430 may further include a protocol selector 414. In some embodiments, the protocol selector 414 may include a switching device (e.g., such as the protocol selector 114A of FIG. 2). Such a protocol selector 414 may be configured to selectively couple an appropriate one of the communication modules 412 to the memory socket 416.

In some embodiments, the protocol selector 414 may include a protocol selector module configured to selectively enable and disable the communication modules 412 (e.g., such as, for example, the protocol selector 114B of FIG. 3). By way of non-limiting example, such a protocol selector module may be implemented in software that is configured for execution by the chipset 436.

The protocol selector 414 may be configured to enable the control circuitry 430 to selectively communicate through the memory socket 416 using any of the plurality of communication protocols. The protocol selector 414 may be configured to receive a protocol indicator 428 from an electronic device 120 (FIG. 1) inserted into the memory socket 416. The protocol indicator 428 may be configured to indicate to the control circuitry 430 which of the plurality of different communication protocols the control circuitry 430 should use to communicate with the electronic device 120. By way of non-limiting example, Table 1 illustrates an example of a two-bit implementation for the protocol indicator 428.

TABLE 1

| Protocol Indicator 428 | Communication Protocol |
| --- | --- |
| 00 | Memory Bus Protocol |
| 01 | PCIe Protocol |
| 10 | SATA Protocol |
| 11 | Another Protocol (e.g., SAS, QPI, etc.) |

As previously mentioned, the control circuitry 430 may be configured to communicate using a variety of communication protocols. Accordingly, the protocol indicator 428 may be implemented using any number of bits to accommodate the number of different communication protocols. By way of non-limiting example, if the control circuitry 430 is configured to communicate using five different communication protocols, the protocol indicator 428 may include at least a three-bit protocol indicator 428. Also by way of non-limiting example, if the control circuitry 430 is configured to communicate using two different communication protocols, a one-bit protocol indicator 428 may be used.

The memory socket 416 may include a plurality of conductive pads or pins configured to mate with conductive pads or pins (sometimes referred to herein simply as "pins") of electronic devices 120 (FIG. 1) that are inserted into the memory socket 416. One or more of the pins of the memory socket 416 may be configured to receive the protocol indicator 428 from the electronic device 120 inserted into the memory socket 416. Accordingly, the form factor of the memory socket 416 may be slightly altered from a standard memory socket to accommodate the protocol indicator 428. By way of non-limiting example, redundant power pins from a standard DIMM form factor may be used to accommodate the protocol indicator 428 if the memory socket 416 comprises a DIMM socket. Other alterations from the standard memory form factor to accommodate the protocol indicator 428 are also contemplated (e.g., using unused pins for the protocol indicator 428, sharing pins, etc.).

As the form factor of the memory socket 416 may be altered from the standard memory form factor, the electronic devices 120 that are inserted into the memory socket 416 may also be altered from the standard memory form factor to provide the protocol indicator 428. More detail regarding the electronic devices 120 is discussed below with reference to FIGS. 7 through 8C.

A variety of different devices may be implemented in the altered memory form factor as electronic devices 120. By way of non-limiting example, the electronic devices 120 may include storage devices (e.g., solid state drives), memory devices (e.g., DDR SDRAM devices), graphics processing units (GPUs), MPEG4 compressors, video encryption devices, video encoders, security engines, and any other devices capable of communicating using any of the plurality of different communication protocols. As a result, the memory socket 416 may serve as a universal interface for core system components, and for general system expansion. An example of such a system is discussed below with reference to FIG. 10.

As different communication protocols may require the use of different operational voltage potentials, the computer interface board 410 may include an adjustable power supply 438. The adjustable power supply 438 may be configured to supply power 440 to devices inserted into the memory socket 416. The voltage potentials of the power 440 supplied by the adjustable power supply 438 may be adjustable responsive to the protocol indicator 428. In some embodiments, the adjustable power supply 438 may be configured to receive the protocol indicator 428 and adjust the voltage potentials of the power 440 to levels that are compatible with the communication protocol indicated by the protocol indicator 428. In some embodiments, the control circuitry 430 may be configured to adjust the adjustable power supply 438 using a power control signal 442 responsive to receiving the protocol indicator 428. By way of non-limiting example, the adjustable power supply 438 may include a controllable switching device configured to selectively couple the memory socket 416 to different power voltage potentials. Also by way of non-limiting example, the adjustable power supply 438 may be configured to enable and disable a plurality of different power voltage potentials responsive to the protocol indicator 428.

In some embodiments, a computer interface board may comprise control circuitry comprising a central processing unit (CPU) and a chipset operably coupled to the central processing unit. The computer interface board also comprises a memory socket operably coupled to the control circuitry. The control circuitry is configured to communicate through the memory socket selectively using each of a serial advanced technology attachment (SATA) protocol, a peripheral component interconnect express (PCIe) protocol, and a memory protocol.

In some embodiments, the control circuitry is further configured to enable direct memory access to a solid state drive interfacing with the control circuitry through the memory socket. In some embodiments, the central processing unit is configured to receive interrupt messages from an electronic device through the memory socket.

In some embodiments, the computer interface board may comprise an adjustable power supply configured to provide power to an electronic device through the memory socket. The adjustable power supply may also be configured to adjust voltage potentials of the power to be compatible with the electronic device. In some embodiments, the adjustable power supply may be configured to receive a protocol indicator from the electronic device. The protocol indicator may indicate a communication protocol with which the electronic device is configured to communicate. The adjustable power supply may further be configured to adjust the voltage potentials of the power responsive to the protocol indicator.

Figure 5:
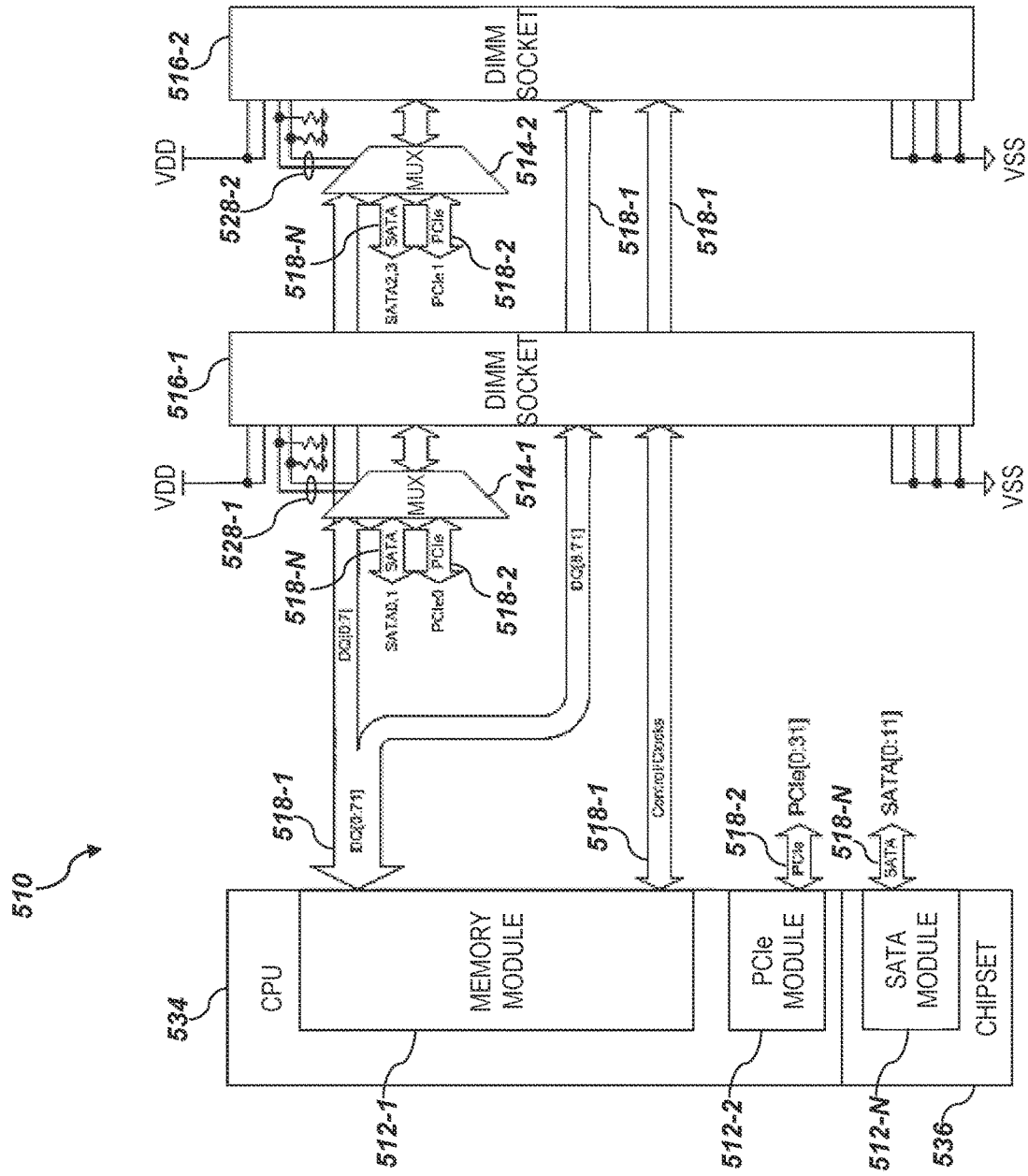
FIG. 5 is a simplified block diagram of a specific, non-limiting example of a computer interface board.

FIG. 5 is a simplified block diagram of a specific, non-limiting example of a computer interface board 510. The computer interface board 510 may include a CPU 534 operably coupled to a chipset 536. The computer interface board 510 may also include DIMM sockets 516-1 and 516-2. The computer interface board 510 may further include multiplexor modules 514-1 and 514-2 configured to enable the CPU 534 and the chipset 536 to selectively communicate using a plurality of different communication protocols through the DIMM sockets 516.

The CPU 534 and the chipset 536 may include a plurality of communication modules 512-1, 512-2, . . . 512-N corresponding to the plurality of different communication protocols. For example, the CPU 534 may include a memory bus communication module 512-1 and a PCIe communication module 512-2. Also, the chipset 536 may include a SATA communication module 512-N. Correspondingly, a memory bus 518-1, a PCIe bus 518-2, and a SATA bus 518-N (sometimes referred to herein simply together as "communication buses" 518, and individually as "communication bus" 518) may be operably coupled to the memory bus communication module 512-1, the PCIe communication module 512-2, and the SATA communication module 512-N, respectively. Although not illustrated in FIG. 5, the CPU 534 and the chipset 536 may include other communication modules 512 (e.g., a SAS communication module, a QPI communication module, etc.) operably coupled to other communication buses 518.

The multiplexor modules 514-1 and 514-2 may be operably coupled between the respective DIMM sockets 516-1 and 516-2 and selected portions of the memory bus 518-1, the PCIe bus 518-2, and the SATA bus 518-N. The multiplexor modules 514-1 and 514-2 may also be configured to receive protocol indicators 528-1 and 528-2, respectively, from DIMM sockets 516-1 and 516-2, respectively. The multiplexor modules 514-1 and 514-2 may be configured to operably couple the respective DIMM sockets 516-1 and 516-2 to the selected portions of the communication buses 518 responsive to the protocol indicators 528-1 and 528-2. For example, multiplexor module 514-1 may be operably coupled between DIMM socket 516-1, and DQ[0:7] from the memory bus 518-1, SATA0,1 from the SATA bus 518-N, and PCIe0 from the PCIe bus 518-2. Multiplexor module 514-1 may therefore be configured to operably couple the DQ[0:7] from the memory bus 518-1, the SATA0,1 from the SATA bus 518-N, or the PCIe0 from the PCIe bus 518-2 to the DIMM socket 516-1 responsive to the protocol indicator 528-1 indicating a communication protocol corresponding thereto. Likewise, multiplexor module 514-2 may be configured to operably couple DQ[0:7] from the memory bus 518-1, SATA2,3 from the SATA bus 518-N, or PCIe1 from the PCIe bus 518-2 to the DIMM socket 516-2 responsive to the protocol indicator 528-2.

As also illustrated in FIG. 5, the computer interface board 510 may also be configured to provide power VDD and VSS to the DIMM sockets 516-1 and 516-2. Furthermore, DQ[8:71] and other commands CONTROL/CLOCKS (e.g., row address select (RAS), column address select (CAS), write enable (WE), output enable (OE), etc.) from the memory bus 518-1 may also be provided to the DIMM sockets 516-1 and 516-2. It should be noted that DQ[8:71] and the other commands CONTROL/CLOCKS from the memory bus 518-1 may, in some embodiments, be provided directly to the DIMM sockets 516-1, 516-2 without intervention from the multiplexor modules 514-1, 514-2. Some second electronic devices 120 that may be inserted into the DIMM sockets 516-1, 516-2 may not use DQ[8:71] and the other commands CONTROL/CLOCKS from the memory bus 518-1 (e.g., SATA, PCIe devices). Such second electronic devices 120 may be configured to leave pins that operably couple to DQ[8:71] and the other commands CONTROL/CLOCKS from the memory bus 518-1 of their mating connectors 126 (FIG. 1) disconnected from their circuitry, as will be discussed with reference to FIGS. 8B and 8C.

Figure 6:
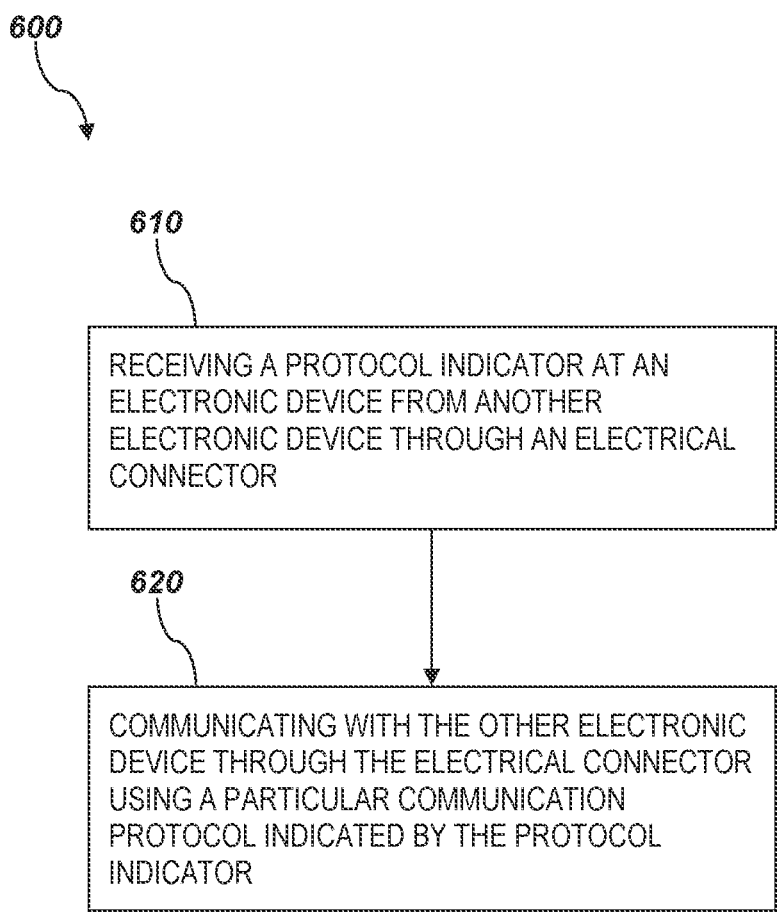
FIG. 6 is a flowchart illustrating a method of operating an electrical system.

FIG. 6 is a flowchart 600 illustrating a method of operating an electrical system 100 (FIG. 1). Referring to FIGS. 1 and 6 together, at operation 610, the method may comprise receiving a protocol indicator 128 at an electronic device 110 from another electronic device 120 through an electrical connector 116. The protocol indicator 128 may indicate a communication protocol of a plurality of different communication protocols with which the electronic device 110 is configured to communicate through the electrical connector 116. In some embodiments, receiving the protocol indicator 128 at the electronic device 110 from the other electronic device 120 through the electrical connector 116 comprises receiving the protocol indicator 128 with a computer interface board 410, 510 from the other electronic device 120 through a memory socket 416, 516-1, 516-2 (FIGS. 4 and 5). In some embodiments, receiving the protocol indicator 128 at the electronic device 110 comprises receiving the protocol indicator 128 with a computer interface board 410, 510 from the other electronic device 120 through a DIMM socket 516-1, 516-2.

At operation 620, the method may comprise communicating with the other electronic device 120 through the electrical connector 116 using the indicated communication protocol. In some embodiments, communicating with the other electronic device 120 through the electrical connector 116 using the indicated communication protocol may comprise coupling one of a plurality of communication modules 112 of the electronic device 110 that corresponds to the indicated communication protocol to some or all of the signal lines of the electrical connector 116 with a switching device 114A, 514-1, 514-2. Each of the plurality of communication modules 112 may correspond to one of the plurality of different communication protocols. In some embodiments, communicating with the other electronic device 120 through the electrical connector 116 using the indicated communication protocol may comprise activating one of a plurality of communication modules 112 that corresponds to the indicated communication protocol. Each of the communication modules 112 may correspond to one of the plurality of different communication protocols. Also, each of the plurality of different communication modules 112 may be operably coupled to the electrical connector 116 using some or all of the signal lines of the electrical connector 116.

In some embodiments, communicating with the other electronic device 120 through the electrical connector 116 using the indicated communication protocol may comprise communicating with a solid state drive through a memory socket 416, 516-1, 516-2 using one of a SATA protocol, a PCIe protocol, and a SAS protocol. In some embodiments, communicating with the other electronic device 120 through the electrical connector 116 may comprise communicating with a random access memory device through a memory socket 416, 516-1, 516-2. In some embodiments, communicating with the other electronic device 120 through the electrical connector 116 may comprise communicating with a storage device through a memory socket 416, 516-1, 516-2. In some embodiments, communicating with the other electronic device 120 through the electrical connector 116 may comprise communicating with a graphics processing unit through a memory socket 416, 516-1, 516-2. In some embodiments, communicating with the other electronic device 120 through the electrical connector 116 may comprise communicating with a random access memory device through a memory socket 416, 516-1, 516-2.

In some embodiments, a method may include receiving a protocol indicator at an electronic device 110 from another electronic device 120 through a memory socket 416, 516-1, 516-2. The protocol indicator indicates a communication protocol of a plurality of different communication protocols with which the electronic device is configured to communicate through the memory socket. The method may also include communicating with the other electronic device through the memory socket using the indicated communication protocol.

In some embodiments, communicating with the other electronic device 120 through the memory socket 416, 516-1, 516-2 using the indicated communication protocol includes coupling one of a plurality of communication modules 122 that corresponds to the indicated communication protocol to the memory socket 416, 516-1, 516-2 with a switching device. Each of the plurality of communication modules corresponds to one of the plurality of different communication protocols.

In some embodiments, communicating with the other electronic device 120 through the memory socket 416, 516-1, 516-2 using the indicated communication protocol includes activating one of a plurality of communication modules that corresponds to the indicated communication protocol. Each of the communication modules corresponds to one of the plurality of different communication protocols. Each of the plurality of communication modules is operably coupled to the memory socket.

In some embodiments, communicating with the other electronic device 120 through the memory socket 416, 516-1, 516-2 using the indicated communication protocol includes communicating with a solid state drive through the memory socket using a communication protocol selected from the group consisting of a serial advance technology attachment (SATA) protocol, a peripheral component interconnect express (PCIe) protocol, and a serial attached SCSI (SAS) protocol.

In some embodiments, a method of operating an electrical system comprises receiving a protocol indicator at an electronic device from another electronic device through a memory socket. The protocol indicator indicates a communication protocol of a plurality of different communication protocols with which the electronic device is configured to communicate through the memory socket. The method also comprises communicating with the other electronic device through the memory socket using the indicated communication protocol.

In some embodiments, a method of operating an electrical system comprises receiving a protocol indicator from an electronic device received into a memory socket of a computer interface board. The protocol indicator indicates a selected communication protocol of a plurality of communication protocols with which control circuitry of the computer interface board is configured to communicate through the memory socket. The method further comprises communicating through the memory socket with the electronic device using the selected communication protocol of the plurality of communication protocols.

In some embodiments, communicating through the memory socket with the electronic device may comprise communicating with a random access memory device through the memory socket. In some embodiments, communicating through the memory socket with the electronic device may comprise communicating with a storage device through the memory socket. In some embodiments, communicating through the memory socket with the electronic device may comprise communicating with a graphics processing unit through the memory socket.

Figure 7:
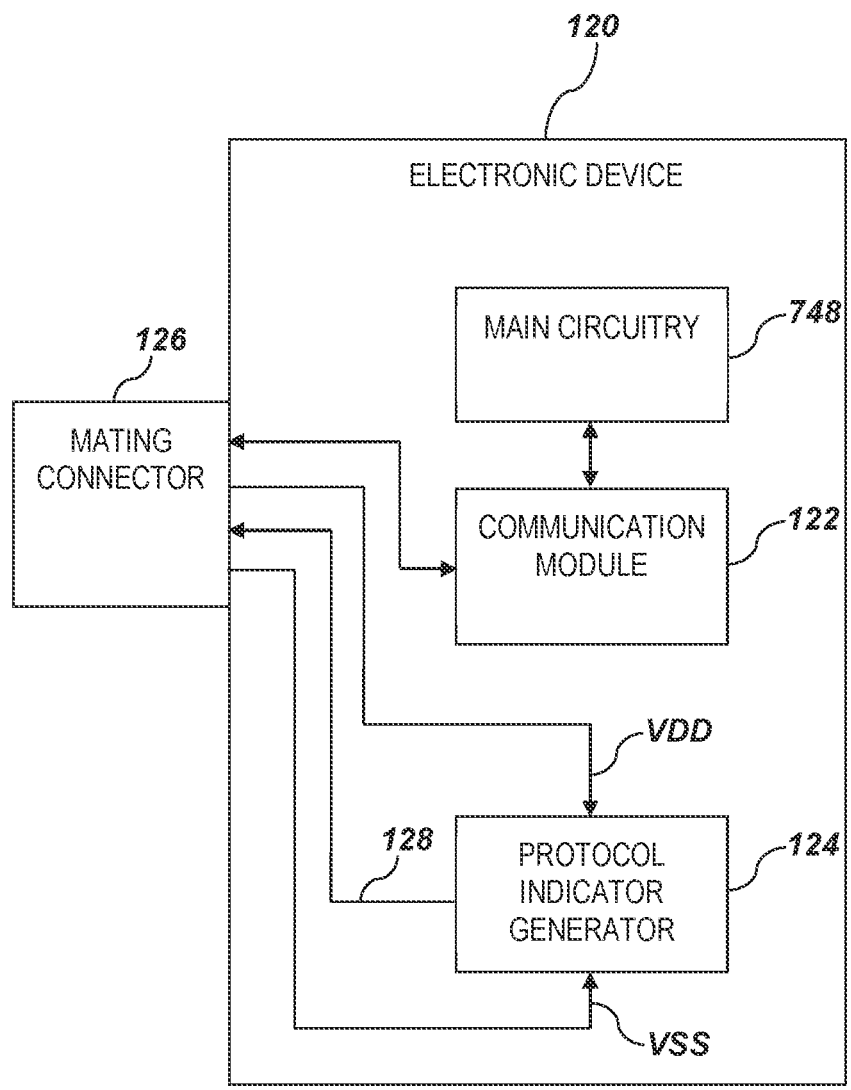
FIG. 7 is a simplified block diagram of an example of an electronic device of the electrical system of FIG. 1.

FIG. 7 is a simplified block diagram of an example of an electronic device 120 of the electrical system 100 of FIG. 1. The electronic device 120 may include a mating connector 126, main circuitry 748, a communication module 122, and a protocol indicator generator 124. The mating connector 126 may be configured to mate with the electrical connector 116 of the electronic device 110 (FIG. 1). By way of non-limiting example, if the electrical connector 116 is a DIMM socket 516-1, 516-2, then the electronic device 120 may be implemented using a DIMM form factor, and the mating connector 126 may comprise a plurality of conductive pads at the edge of a printed circuit board (PCB) that are configured to mate with the DIMM sockets 516-1, 516-2 (FIG. 5).

The main circuitry 748 may comprise electronic circuitry configured to perform the tasks the electronic device 120 is configured to perform. By way of non-limiting example, the main circuitry 748 may include controllers, DRAM chips, NAND Flash storage chips, processors, other devices, and combinations thereof. Also by way of non-limiting example, if the electronic device 120 is a DRAM DIMM, the main circuitry 748 may comprise a memory controller and one or more DRAM chips.

The communication module 122 may be configured to enable the electronic device 120 to communicate using a particular communication protocol. By way of non-limiting example, if the electronic device 120 is a DRAM device, the communication module 122 may include a memory communication module configured to enable the electronic device 120 to communicate using a memory communication protocol (e.g., a DDR SDRAM communication protocol). Also by way of non-limiting example, if the electronic device 120 is a solid state drive, the communication module 122 may include a SATA communication module or a PCIe communication module configured to enable the electronic device 120 to communicate using a SATA protocol, or a PCIe protocol, respectively. As further non-limiting examples, the communication module 122 may also include any of a SAS communication module, a QPI communication module, or any other communication module 122.

The protocol indicator generator 124 may be configured to generate a protocol indicator 128 indicating the particular communication protocol that the electronic device 120 is configured to communicate with. In some embodiments, the protocol indicator generator 124 may be implemented by tying one or more pins of the mating connector 126 to one of a high power signal VDD defining a logic level high, and a low power signal VSS defining a logic level low in a configuration that indicates the particular communication protocol. In some embodiments, the protocol indicator generator 124 may be configured to buffer the bits of the protocol indicator 128 (e.g., by using a CMOS driver, a unity gain buffer, etc.). As previously discussed, the protocol indicator 128 may include a number of bits that accommodates a number of communication protocols that the electronic device 110 is configured to selectively communicate with (see Table 1 above for a non-limiting example of a two-bit protocol indicator 128). The protocol indicator generator 124 may be configured to output the protocol indicator 128 to the electronic device 110 through the mating connector 126.

In some embodiments, the electronic device 120 may be configured to receive the power VDD, VSS through the mating connector 126 from the electronic device 110 through the mating connector 126. In some embodiments, the electronic device 120 may include its own power source (e.g., a battery). In some embodiments, the second electronic device 120 may be configured to receive the power VDD, VSS through a different connector (not shown), other than the mating connector 126.

When the mating connector 126 of the electronic device 120 is coupled to the electrical connector 116 of the electronic device 110 (FIG. 1), the protocol indicator generator 124 may provide the protocol indicator 128 indicating the particular communication protocol corresponding to the communication module 122 to the electronic device 110. Responsive to the protocol indicator 128, the electronic device 110 may communicate using the particular communication protocol. Communication between the electronic device 110 and the electronic device 120 may thus be enabled, as long as the electronic device 110 includes a communication module 112 that corresponds to the particular communication protocol.

In some embodiments, an electronic device comprises a protocol indicator generator configured to provide a protocol indicator to another electronic device through an electrical connector of the other electronic device. The protocol indicator indicates a particular communication protocol with which the electronic device is configured to communicate. The electronic device also comprises a communication module configured to communicate with the other electronic device through the electrical connector using the particular communication protocol.

In some embodiments, the electronic device may further comprise a solid state drive configured to communicate using any of a PCIe protocol, a SATA protocol, and a SAS protocol with a computer interface board through a memory socket of the computer interface board. In some embodiments, the solid state drive may be configured to transfer stored data to a memory device of the computer interface board using direct memory access (DMA) where the stored data can be operated on by a central processing unit (CPU) of the computer interface board. In some embodiments, the solid state drive may be configured to send interrupt messages to a CPU of the computer interface board through the memory socket.

In some embodiments, the electronic device may further comprise one or more protocol indicating pins for outputting the protocol indicator. Each of the one or more protocol indicating pins may be tied to one of a high power signal VDD defining a logic level high and a low power signal VSS defining a logic level low in an arrangement that indicates the particular communication protocol.

FIGS. 8A through 8C are simplified block diagrams of non-limiting examples of electronic devices 820A, 820B, and 820C configured in a modified DIMM form factor. The electronic devices 820A, 820B, and 820C may each be configured to interface with the computer interface board 410, 510 (FIGS. 4, 5) through pins 826A, 826B, and 826C, respectively. The pins 826A, 826B, and 826C may be configured to interface with a memory socket 416, 516-1, 516-2 (FIGS. 4, 5) of the computer interface board 410, 510. The electronic devices 820A, 820B, and 820C may also each be configured to receive power signals VDD, VSS from the computer interface board 410, 510.

Referring to FIG. 8A, the electronic device 820A may comprise a DRAM device configured as a JEDEC standard DIMM module (i.e., a DDR SDRAM module). The electronic device 820A may comprise main circuitry 822A including a plurality of DRAM chips. The electronic device 820A may be configured to interface with the computer interface board 410, 510 (FIGS. 4 and 5) using a memory protocol.

The electronic device 820A may also be configured to provide a protocol indicator 828A indicating the memory protocol to the computer interface board 410, 510 through the pins 826A. Responsive to receiving the protocol indicator 828A, the computer interface board 410, 510 may enable the electronic device 820A to communicate with a memory bus 818A of the computer interface board 410, 510 through the pins 826A.

Referring to FIG. 8B, the electronic device 820B may comprise a dual SATA storage module. The electronic device 820B may comprise main circuitry 822B including controller chips, DRAM chips, and NAND flash storage chips. The electronic device 820B may be configured to interface with the computer interface board 410, 510 using a SATA protocol.

The electronic device 820B may also be configured to provide a protocol indicator 828B indicating the SATA protocol to the computer interface board 410, 510 through at least some of the pins 826B. Responsive to receiving the protocol indicator 828B, the computer interface board 410, 510 may enable the electronic device 820B to communicate with a SATA bus 818B of the computer interface board 410, 510 through the pins 826B.

SATA interfaces typically include four communication pins per SATA channel and power pins, in contrast to available DIMM form factors that may include between 72 pins (e.g., for SO-DIMMs), and up to 284 pins (e.g., for DDR4 SDRAM DIMMs). Also, the computer interface board 410, 510 that the electronic device 820B may be configured to interface with may apply the DQ[8:71] and other commands CONTROL/CLOCKS from the memory bus 518-1 to the DIMM sockets 516-1 and 516-2, as illustrated in FIG. 5. The electronic device 820B, being a dual SATA storage module, may not be configured to interface with DQ[8:71] and the other commands CONTROL/CLOCKS from the memory bus. Accordingly, the electronic device 820B may not use all of the pins 826B included in the DIMM form factor. Unused pins 826B may be left uncoupled from the main circuitry 822B.

Referring to FIG. 8C, the electronic device 820C may comprise a PCIe storage module. The electronic device 820C may comprise main circuitry 822C including controller chips, DRAM chips, and NAND flash storage chips. The electronic device 820C may be configured to interface with the computer interface board 410, 510 using a PCIe protocol.

The electronic device 820C may also be configured to provide a protocol indicator 828C indicating the PCIe protocol to the computer interface board 410, 510 through the pins 826C. Responsive to receiving the protocol indicator 828C, the computer interface board 410, 510 may enable the electronic device 820C to communicate with a PCIe bus 818C of the computer interface board 410, 510 through the at least some of the pins 826C.

Similar to the electronic device 820B, the electronic device 820C may not use all the pins 826C. Unused pins 826C may be left uncoupled from the main circuitry 822C.

Figure 8:
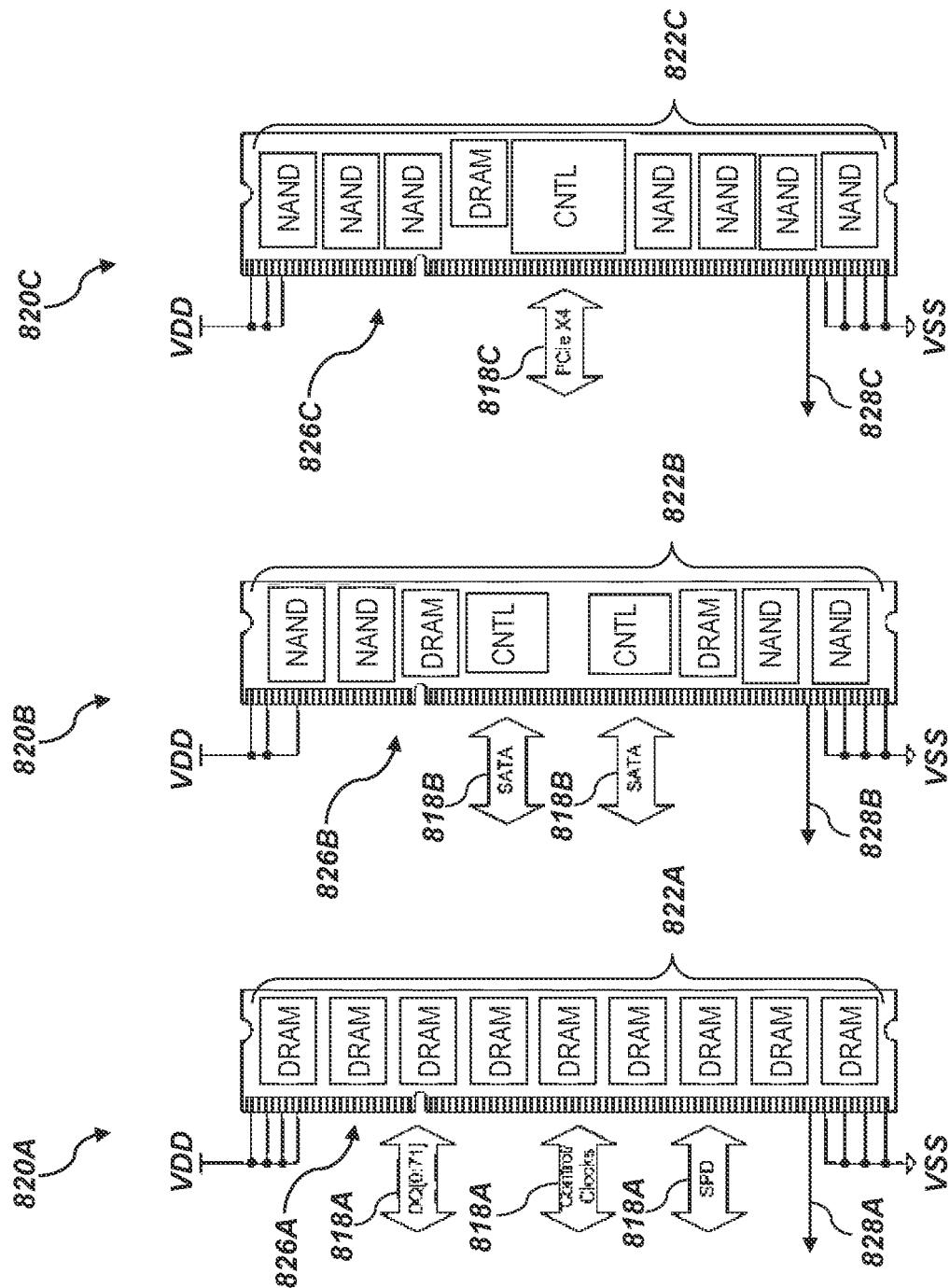
FIGS. 8A through 8C are simplified block diagrams of non-limiting examples of electronic devices configured in a modified DIMM form factor.
Figure 9:
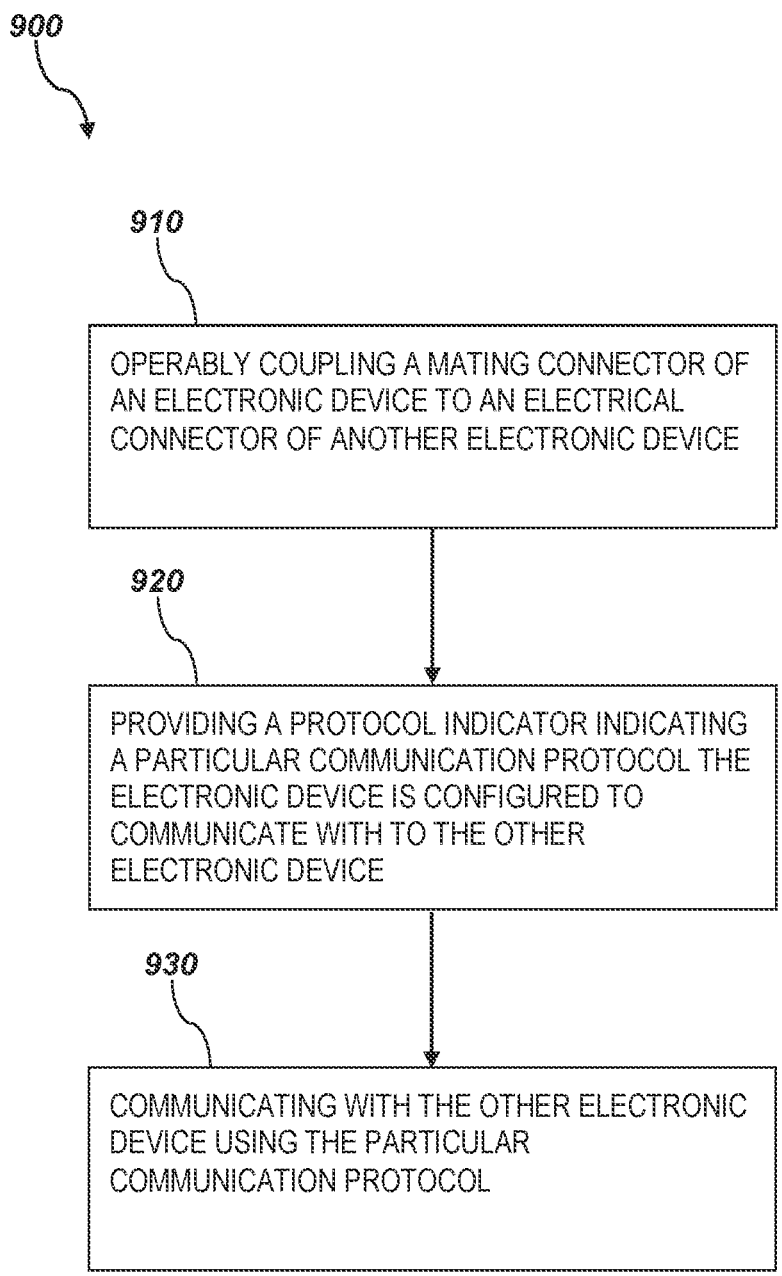
FIG. 9 is a flowchart illustrating a method of operating an electronic device.

FIG. 9 is a flowchart 900 illustrating a method of operating an electronic device 120 (FIGS. 1, 7, 8). Referring to FIGS. 1, 7, 8, and 9 together, at operation 910, the method may include operably coupling the mating connector 126 of an electronic device 120 to the electrical connector 116 of another electronic device 110. In some embodiments, operably coupling the mating connector 126 of an electronic device 120 to the electrical connector 116 may include inserting an electronic device 120 implemented with a memory module form factor into a memory socket 416, 516-1, 516-2 of a computer interface board 410, 510 (FIGS. 4, 5). In some embodiments, inserting the electronic device 120 into the memory socket 416, 516-1, 516-2 may comprise inserting an electronic device 120 implemented with a DIMM form factor into a DIMM socket 516-1, 516-2.

At operation 920, the method may include providing a protocol indicator 128 indicating a particular communication protocol the electronic device 120 is configured to communicate with to the other electronic device 110 through the mating connector 126. By way of non-limiting example, providing the protocol indicator may comprise providing a protocol indicator indicating any of a memory bus protocol, a PCIe protocol, a SATA protocol, a SAS protocol, a QPI protocol, and any other communication protocol.

At operation 930, the method may include communicating with the other electronic device 110 using the particular communication protocol.

Figure 10:
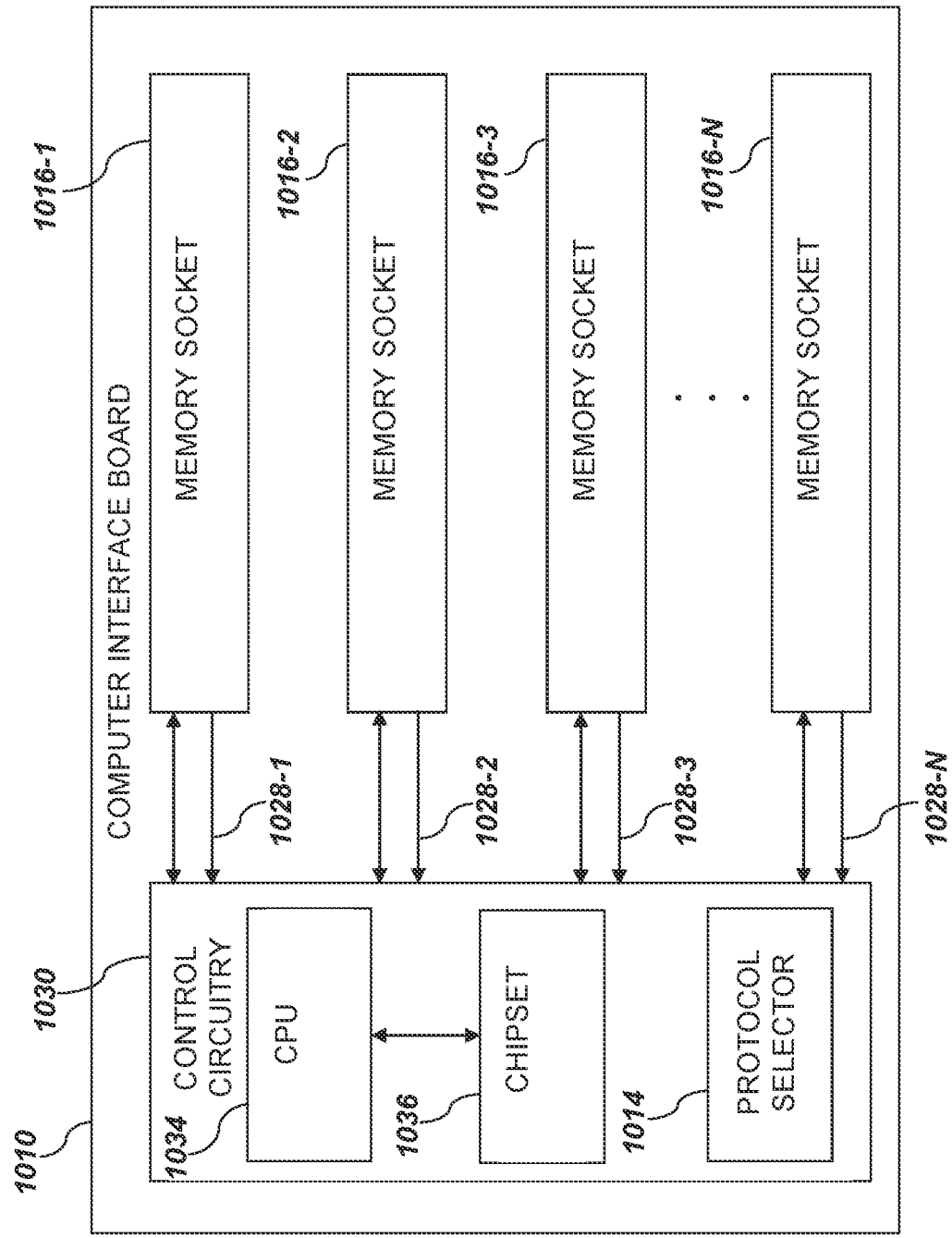
FIG. 10 is a simplified block diagram of another computer interface board.

FIG. 10 is a simplified block diagram of another computer interface board 1010. The computer interface board 1010 may include control circuitry 1030 comprising a protocol selector 1014, and one or more CPUs 1034 operably coupled to a chipset 1036. As previously mentioned with reference to FIG. 4, the memory socket 416 may serve as a universal interface for core system components and general system expansion. The computer interface board 1010 may thus include a plurality of memory sockets 1016-1, 1016-2, 1016-3, . . . 1016-N (sometimes referred to herein simply together as "memory sockets" 1016, and individually as "memory socket" 1016) to accommodate various system components. For example, system memory devices, storage devices (e.g., hard drives, solid state drives, etc.), audio processing devices, graphics processing devices, and other devices may be inserted into any of the memory sockets 1016.

The control circuitry 1030 may be configured to receive a protocol indicator 1028-1, 1028-2, 1028-3, . . . 1028-N (sometimes referred to herein simply together as "protocol indicators" 1028, and individually as "protocol indicator" 1028) from electronic devices 120 (FIGS. 1 and 7) inserted into any of the memory sockets 1016. The protocol selector 1014 may be configured to enable the control circuitry 1030 to communicate with the electronic devices 120 inserted into any of the memory sockets 1016 using particular communication protocols indicated by the respective protocol indicators 1028. As a result, any electronic device 120 that is configured; (1) in a compatible memory form factor, (2) to communicate using one of the communication protocols the control circuitry 1030 is capable of communicating with, and (3) that can provide a protocol indicator 1028 that may be inserted into any of the memory sockets 1016 and communicate with the control circuitry 1030. In other words, RAM devices, solid state drives, and other system components may be inserted into and operated in any of the memory sockets 1016.

The computer interface board 1010, therefore, may provide ease and flexibility in assembling and modifying a computer system including the computer interface board 1010. For example, if a certain amount of memory is desired, memory devices may be inserted into or removed from the memory sockets 1016 until the desired amount of memory is achieved. Also, if a certain amount of storage is desired, storage devices may be inserted into or removed from the memory sockets 1016 until the desired amount of storage is achieved. Furthermore, other peripherals or expansion devices may be inserted into or removed from the memory sockets 1016, as desired.

Also, the computer interface board 1010 may reduce or eliminate the need for cumbersome cables and brackets conventionally used with SATA and PCIe interfaces. In addition, the computer interface board 1010 may communicate with electronic devices 120 through the memory sockets 1016 using the native communication protocols the electronic devices 120 were designed to use without isolating the native communications from the computer interface board 1010. As a result, modifications to system startup software and non-standard device drivers may not be needed to enable the control circuitry 1030 to communicate with the electronic devices 120. Furthermore, all the native features of the various communication protocols may be available (e.g., DMA, CPU interrupts, etc.).

In some embodiments an electrical system comprises a computer interface board including a plurality of memory sockets and control circuitry. The control circuitry is configured to communicate through each of the plurality of memory sockets selectively using any of a plurality of communication protocols. The control circuitry comprises a protocol selector configured to receive protocol indicators from electronic devices inserted into the plurality of memory sockets. The protocol selector is also configured to enable the control circuitry to communicate through the plurality of memory sockets using communication protocols indicated by the protocol indicators.

In some embodiments, the computer interface board may also comprise at least one random access memory device inserted into at least one of the plurality of memory sockets. In some embodiments, the computer interface board may also comprise at least one solid state drive device inserted into at least one of the plurality of memory sockets. In some embodiments, the computer interface board may also comprise at least one graphics processing unit inserted into at least one of the plurality of memory sockets. In some embodiments, each of the plurality of memory sockets may comprise a dual in-line memory module (DIMM) socket.

FIGS. 11A through 12B are eye diagrams resulting from simulations designed to test the effects a multiplexor (e.g., 114A, 514-1, 514-2 of FIGS. 2 and 5) may have on timing of the memory bus. Memory devices rely on accurate timing to adequately perform read and write operations. For example, if timing is even slightly off during read operations, incorrect data may be returned. Likewise, if timing is off during write operations, the write operations may fail, or incorrect data may be saved to the memory device. The addition of a multiplexor on the memory bus may change the capacitive load and the resistance of the memory bus, and may influence timing of read and write operations. Simulations of a two DIMM socket computer interface board were performed to determine whether multiplexors may have a substantial adverse impact on timing in read and write operations.

Figure 11A:
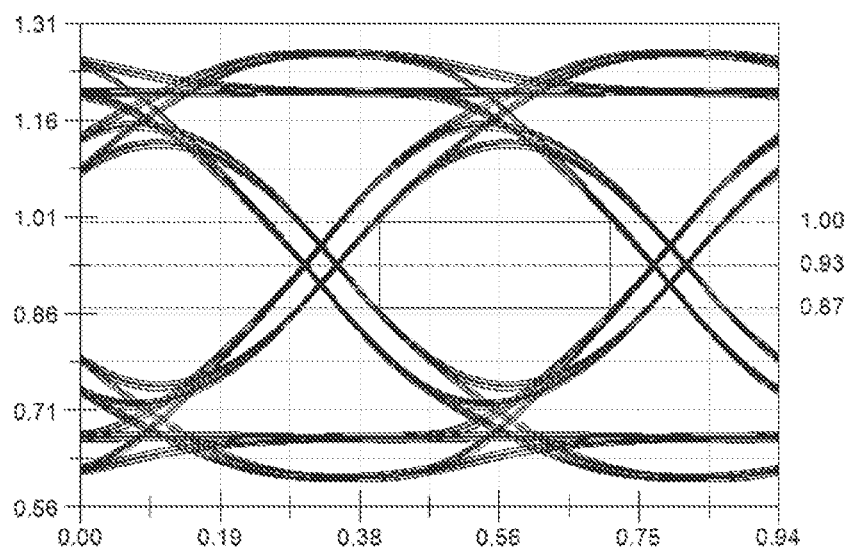
FIGS. 11A and 11B are eye diagrams illustrating results of simulating write operations with a memory device without a multiplexor and with the multiplexor, respectively.
Figure 11B:
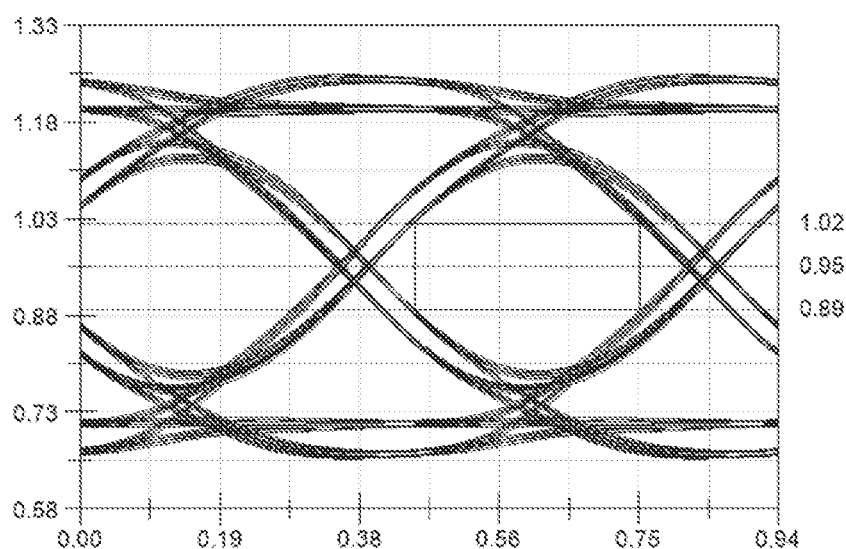

FIGS. 11A and 11B are eye diagrams 1100A and 1100B, respectively, illustrating the results of simulating write operations with a memory device in one of the DIMM sockets without the multiplexor, and with the multiplexor, respectively. As a comparison of the eye diagrams 1100A and 1100B reveals, the multiplexor does not appear to have a substantial adverse impact on timing in write operations.

Figure 12A:
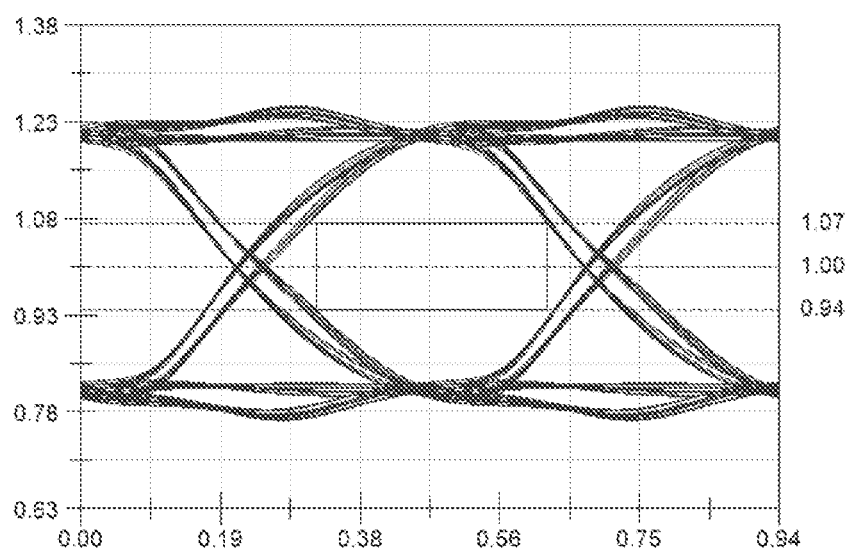
FIGS. 12A and 12B are eye diagrams illustrating results of simulating read operations with a memory device without a multiplexor and with the multiplexor, respectively.
Figure 12B:
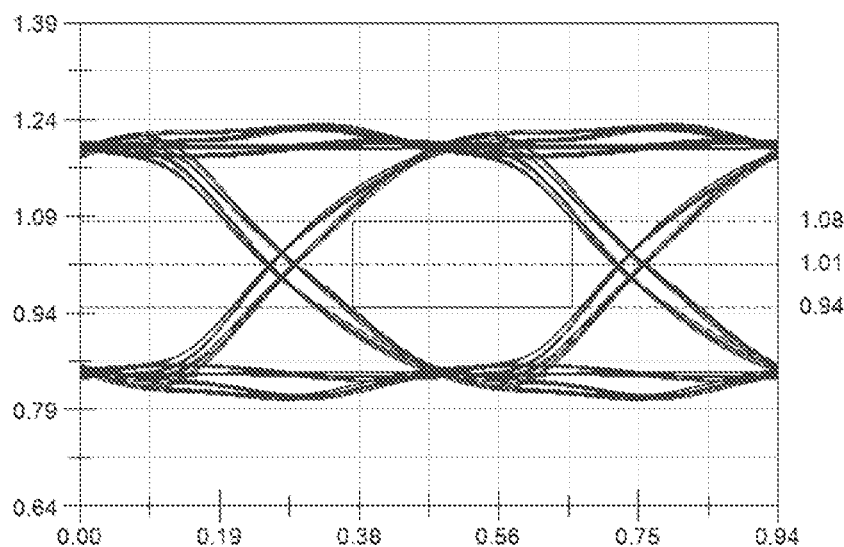

FIGS. 12A and 12B are eye diagrams 1200A and 1200B, respectively, illustrating the results of simulating read operations with a memory device in one of the DIMM sockets without the multiplexor, and with the multiplexor, respectively. As a comparison of the eye diagrams 1200A and 1200B reveals, the multiplexor does not appear to have a substantial adverse impact on timing in read operations.

Figure 13:
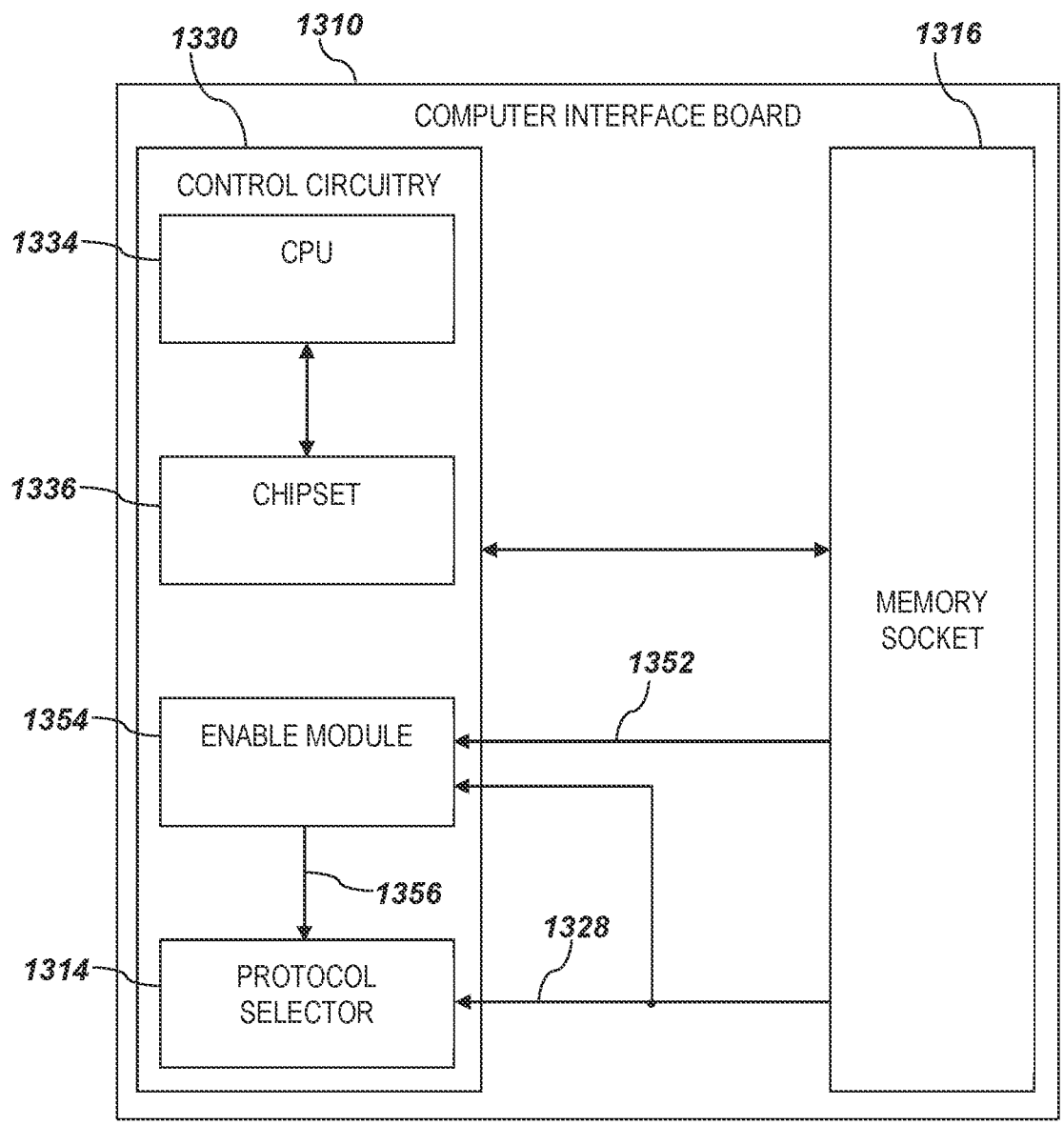
FIG. 13 a simplified block diagram of another computer interface board.

FIG. 13 a simplified block diagram of another computer interface board 1310. The computer interface board 1310 may include control circuitry 1330 operably coupled to a memory socket 1316. The control circuitry 1330 may include a protocol selector 1314, and one or more CPUs 1334 operably coupled to a chipset 1336. Similar to any of the protocol selectors 114, 114A, 114B, 414, 514-1, 514-2, and 1014 (FIGS. 1 through 5 and 10) discussed above, the protocol selector 1314 may be configured to receive a protocol indicator 1328 indicating a communication protocol with which an electronic device 120, 820A, 820B, 820C (FIGS. 1, 7, 8A, 8B, and 8C) (e.g., a storage module) is configured to communicate from the electronic device 120, 820A, 820B, 820C through the memory socket 1316. The protocol selector 1314 may also be configured to enable the control circuitry 1330 to communicate through the memory socket 1316 using the communication protocol indicated by the protocol indicator 1328.

The control circuitry 1330 may be configured to enable, during operation of the computer interface board 1310, electronic devices 120, 820A, 820B, 820C to be inserted into the memory socket 1316 and operated without powering down or rebooting the computer interface board 1310 (i.e., "hot insertion"). During a "hot insertion" of an electronic device 120, 820A, 820B, 820C, the protocol selector 1314 may be disabled until the electronic device 120, 820A, 820B, 820C is fully seated in the memory socket 1316 to prevent corruption of data transfers on the memory bus.

In some embodiments, the computer interface board 1310 may only support hot insertion for electronic devices 120, 820A, 820B, 820C that communicate using certain communication protocols. By way of non-limiting example, the computer interface board 1310 may only support hot insertion for electronic devices 120, 820A, 820B, 820C that communicate using a PCIe protocol, a SATA protocol, or a SAS protocol, but not for electronic devices 120, 820A, 820B, 820C that communicate using a memory protocol. During a hot insertion of an unsupported electronic device 120, 820A, 820B, 820C, the protocol selector 1314 may be enabled.

The control circuitry 1330 may include an enable module 1354 configured to detect insertion of an electronic device 120, 820A, 820B, 820C into the memory socket 1316. For example, the enable module 1354 may be configured to receive a presence detect signal 1352 from the electronic device 120, 820A, 820B, 820C through the memory socket 1316. The enable module 1354 may also be configured to detect the communication protocol with which the electronic device 120, 820A, 820B, 820C is configured to communicate. For example, the enable module 1354 may be configured to receive the protocol indicator 1328 from the electronic device 120, 820A, 820B, 820C through the memory socket 1316.

The enable module 1354 may be operably coupled to the protocol selector 1314. The enable module 1354 may be configured to output an enable signal 1356 to the protocol selector 1314. That is, the enable module 1354 may be configured to selectively enable and disable the protocol selector 1314 by asserting and negating (e.g., by applying a digital one and zero, respectively, or vice versa) the enable signal 1356. Responsive to detecting an insertion of an electronic device 120, 820A, 820B, 820C (FIGS. 1, 7, 8A, 8B, and 8C), the enable module 1354 may be configured to disable the protocol selector 1314 for a predetermined time (e.g., 1 second) after detecting the insertion of the electronic device 120, 820A, 820B, 820C. The predetermined time may be selected to provide sufficient time for the electronic device 120, 820A, 820B, 820C to be properly seated into the memory socket 1316. The enable module 1354 may also be configured to enable the protocol selector 1314 after the predetermined time.

In some embodiments, the enable module 1354 may include a processor (e.g., a microcontroller) on the computer interface board 1310. The processor may be programmed to perform at least a portion of the functions the enable module 1354 is configured to perform. In some embodiments, the enable module 1354 and the protocol selector 1314 may be implemented together. By way of non-limiting example, both the enable module 1354 and the protocol selector 1314 may be implemented as software executed by at least one of the chipset 1336 and the CPU 1334. In some embodiments, the enable module 1354 and the protocol selector 1314 may be implemented separately (e.g., as a processor and a switching device, respectively).

In operation, the enable module 1354 may detect an insertion of an electronic device 120, 820A, 820B, 820C (FIGS. 1, 7, 8A, 8B, and 8C) in the memory socket 1316 (e.g., by receiving the presence detect signal 1352). Also, the enable module 1354 may detect the communication protocol with which the electronic device 120, 820A, 820B, 820C is configured to communicate (e.g., by receiving the protocol indicator 1328). If the protocol indicator 1328 indicates a communication protocol for which the computer interface board 1310 supports hot insertion, (e.g., a SATA, SAS, or PCIe protocol), the enable module 1354 may disable the protocol selector 1314, and then enable the protocol selector 1314 a predetermined time (e.g., 1 second) after detecting the insertion of the electronic device 120, 820A, 820B, 820C (e.g., by asserting the enable signal 1356). The enabled protocol selector 1314 may then enable communication between the control circuitry 1330 and the electronic device 120, 820A, 820B, 820C through the memory socket 1316. If the protocol indicator 1328 indicates a communication protocol for which the computer interface board 1310 does not support hot insertion (e.g., a memory protocol), the enable module 1354 may enable the protocol selector 1314, and keep the protocol selector 1314 enabled.

Figure 14:
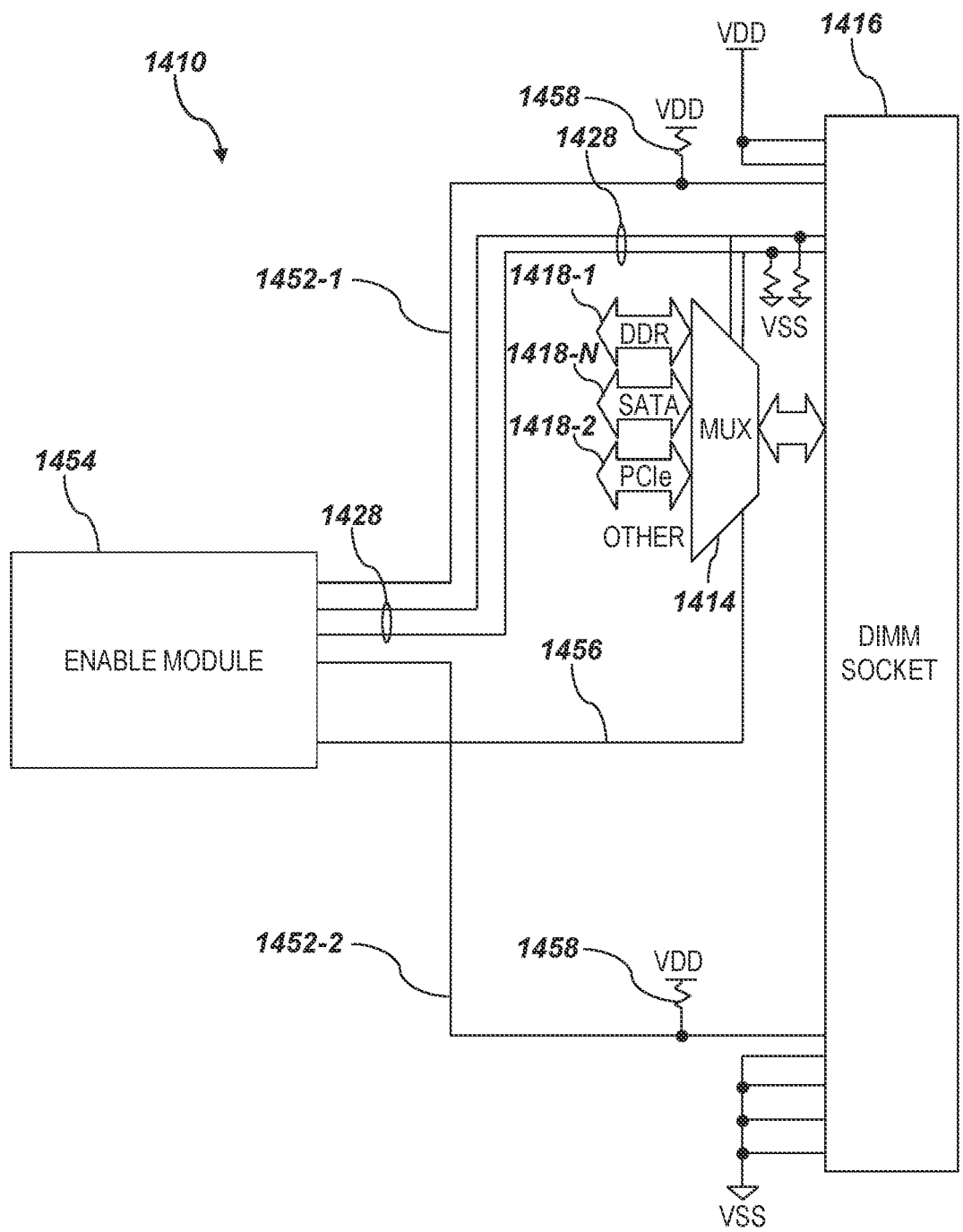
FIG. 14 is a simplified block diagram of another non-limiting example of a computer interface board.

FIG. 14 is a simplified block diagram of another non-limiting example of a computer interface board 1410. The computer interface board 1410 may include a DIMM socket 1416 operably coupled to control circuitry including an enable module 1454 (e.g., a microcontroller) and a protocol selector 1414 (e.g., a field effect transistor multiplexor module). The enable module 1454 and the protocol selector 1414 may each be configured to receive a protocol indicator 1428 from an electronic device 120, 820A, 820B, 820C (FIGS. 1, 7, 8A, 8B, and 8C) through the DIMM socket 1416.

Also, the enable module 1454 may be configured to receive presence detect signals 1452-1, 1452-2 from the electronic device 120, 820A, 820B, 820C through the DIMM socket 1416. In some embodiments, the presence detect signals 1452-1, 1452-2 may be provided to the DIMM socket 1416 by pins of the electronic device 120, 820A, 820B, 820C that are tied to a power supply (e.g., VSS). The mating conductors of the computer interface board 1410 may, therefore, be operably coupled to an opposite power supply (e.g., VDD) through resistors 1458. As a result, the presence detect signals 1452-1, 1452-2 may provide a high voltage (e.g., VDD) to the enable module 1454 when no device is inserted into the DIMM socket 1416. Also, the presence detect signals 1452-1, 1452-2 may provide a low voltage (e.g., VSS) to the enable module 1454 when a device is inserted into the DIMM socket 1416. Of course, in some embodiments, the presence detect signals 1452-1, 1452-2 may be provided to the DIMM socket 1416 by pins of the electronic device that are tied to VDD, and the mating conductors of the computer interface board 1410 may be operably coupled to VSS through resistors 1458. As a result, the presence detect signals 1452-1, 1452-2 may provide a low voltage (e.g., VSS) to the enable module 1454 when no device is inserted into the DIMM socket 1416. Also, the presence detect signals 1452-1, 1452-2 may provide a high voltage (e.g., VDD) to the enable module 1454 when a device is inserted into the DIMM socket 1416.

The enable module 1454 may be operably coupled to an enable input 1456 of the protocol selector 1414 to enable the enable module 1454 to selectively enable and disable the protocol selector 1414, similar to the enable module 1354 and the protocol selector 1314 discussed above with reference to FIG. 13. When enabled, the protocol selector 1414 may be configured to selectively couple one of a memory bus 1418-1, a PCIe bus 1418-2, a SATA bus 1418-N, and any other communication bus (e.g., a SAS bus) to the DIMM socket 1416 (and consequently, to the electronic device 120, 820A, 820B, 820C inserted into the DIMM socket 1416). The protocol selector 1414 may be configured to operably couple the DIMM socket 1416 to the one of the buses 1418-1, 1418-2, . . . and 1418-N that corresponds to the communication protocol indicated by the protocol indicator 1428. When disabled, the protocol selector 1414 may isolate the DIMM socket 1416 from the memory bus 1418-1, the PCIe bus 1418-2, the SATA bus 1418-N, and any other communication bus. While the protocol selector 1414 is disabled, the electronic device 120, 820A, 820B, 820C may be adjusted within the DIMM socket 1416 until properly seated within the DIMM socket 1416 without corrupting transfers on the memory bus 1418-1. Accordingly, the computer interface board 1410 may be configured to enable hot insertion of the electronic device 120, 820A, 820B, 820C.

It may be relatively simpler to enable hot insertion of non-memory module type electronic devices 120, 820A, 820B, 820C (e.g., storage modules) into the DIMM socket 1416 than to enable hot insertion of memory module type electronic devices 120, 820A, 820B, 820C (e.g., JEDEC standard DIMM modules) in part because of the relatively dense input/output (I/O) of memory modules. Also, hot insertion of memory modules may involve communication with the CPU and/or a memory controller to initiate training of the memory channel. Accordingly, in some embodiments, the computer interface board 1410 may be configured to only enable hot insertion of non-memory modules. In some embodiments, however, the computer interface board may support hot insertion of memory modules. In such embodiments, the protocol selector 1414 may include sufficient switching elements to support the relatively dense I/O of memory modules. Also, the enable module 1454 may be configured to communicate with the CPU and/or the memory controller to initiate training of the memory channel.

When an electronic device is inserted into the DIMM socket 1416 while the computer interface board 1410 is operating, the enable module 1454 may detect the insertion, and the communication protocol indicated by the protocol indicator 1428. If the indicated protocol is one for which the computer interface board 1410 supports hot insertion, the enable module 1454 may disable the protocol selector 1414 for a sufficient time to enable proper positioning of the electronic device in the DIMM socket 1416. While the protocol selector 1414 is disabled, the protocol selector 1414 may isolate the DIMM socket 1416 from the buses 1418-1, 1418-2, . . . and 1418-N. If the indicated protocol is not one for which the computer interface board 1410 supports hot insertion, the enable module 1454 may enable the protocol selector 1414.

In some embodiments, the presence detect signals 1452-1, 1452-2 may be received by the DIMM socket 1416 near opposing ends of the DIMM socket 1416. This configuration may facilitate the enable module 1454 in determining whether the electronic device 120, 820A, 820B, 820C is properly seated into the DIMM socket 1416. For example, if the enable module 1454 only receives one of the presence detect signals 1452-1, 1452-2, the electronic device 120, 820A, 820B, 820C may be incorrectly or only partially inserted into the DIMM socket 1416. In other words, if an electronic device 120, 820A, 820B, 820C is detected, the enable module 1454 may disable the protocol selector 1414 and keep it disabled unless both presence detect signals 1452-1 and 1452-2 are asserted, and for a predetermined time after both presence detect signals 1452-1 and 1452-2 are asserted. In some embodiments, a single presence detect signal (not shown), may be used. In some embodiments, more than two presence detect signals (not shown) may also be used.

In some embodiments, a computer interface board includes control circuitry configured to enable the computer interface board to receive an electronic device into a memory socket of the computer interface board during operation of the computer interface board. The control circuitry may also be configured to interact with the electronic device through the memory socket without rebooting the computer interface board.

In some embodiments, the control circuitry may include a protocol selector configured to enable the control circuitry to communicate with the electronic device through the memory socket using a communication protocol indicated by a protocol indicator received from the electronic device through the memory socket. The control circuitry may further include an enable module configured to disable the protocol selector for a predetermined time responsive to detecting an insertion of the electronic device into the memory socket. The enable module may also be configured to enable the protocol selector after the predetermined time.

Figure 15B:
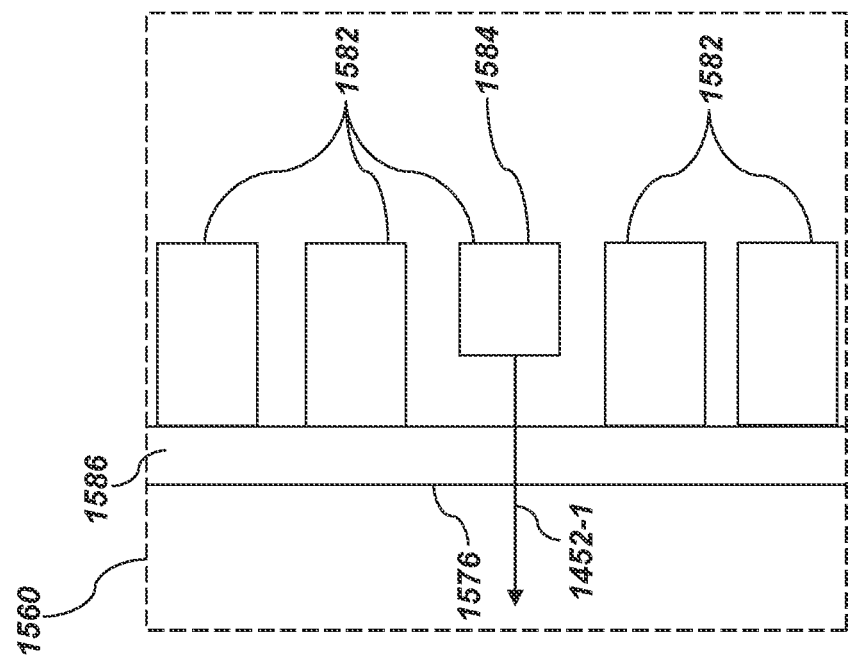
FIGS. 15A and 15B are simplified plan views of another non-limiting example of an electronic device.
Figure 15A:
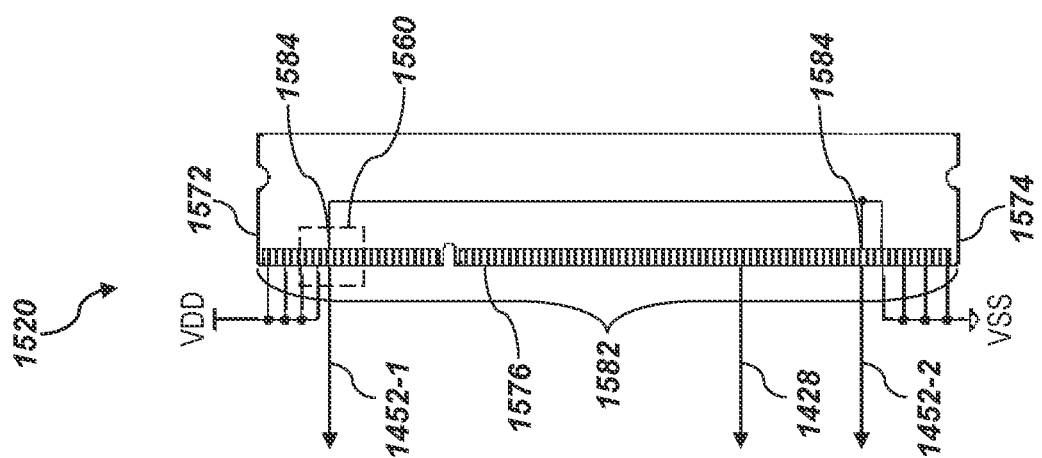

FIGS. 15A and 15B are simplified plan views of another non-limiting example of an electronic device 1520. FIG. 15A is a simplified plan view of the electronic device 1520. FIG. 15B is an enlarged portion shown as dashed rectangle 1560 of the simplified plan view of the electronic device 1520 of FIG. 15A. The portion of the simplified plan view of FIG. 15A that is illustrated in FIG. 15B is indicated in FIG. 15A with a dashed rectangle 1560.

Referring to FIGS. 15A and 15B together, the electronic device 1520 may be configured for hot insertion into the DIMM socket 1416 of the computer interface board 1410 illustrated in FIG. 14. The electronic device 1520 may be similar to any of the electronic devices 120, 820A, 820B, 820C discussed above with reference to FIGS. 1, 7, and 8A through 8C. For example, the electronic device 1520 may include a communication module (not shown), and a protocol indicator generator (not shown) configured to generate a protocol indicator indicating the communication protocol with which the communication module is configured to communicate. The electronic device 1520 may also include main circuitry. For simplicity, these features are not shown in FIG. 15A.

The electronic device 1520 may include a leading edge 1576 including a beveled edge 1586, and conductive pads 1582 (may also be referred to herein as "pins") arranged along the leading edge 1576. The conductive pads 1582 may be configured to operably couple to mating conductors of the DIMM socket 1416 (FIG. 14) when the leading edge 1576 is inserted into the DIMM socket 1416. A portion of the conductive pads 1582 may be configured to receive power (e.g., VDD, VSS) from the computer interface board 1410 (FIG. 14). Another portion of the conductive pads 1582 may be configured to provide the protocol indicator 1428 to the computer interface board 1410 through the DIMM socket 1416 (FIG. 14). Also, some of the conductive pads 1582, namely conductive pads 1584, may be configured to provide the presence detect signals 1452-1, 1452-2 to the computer interface board 1410 through the DIMM socket 1416 (FIG. 14).

In some embodiments, the conductive pads 1584 that are configured to deliver the presence detect signals 1452-1, 1452-2 may be located on opposite sides of the electronic device 1520. For example, one of the conductive pads 1584 may be located near a first side 1572 of the electronic device 1520, and another of the conductive pads 1584 may be located near a second side 1574 of the electronic device 1520 that is opposite the first side 1572.

The conductive pads 1584 may be operably coupled to other conductive pads 1582 that are configured to receive power (e.g., VDD or VSS) from the computer interface board 1410. As illustrated in FIG. 15A, the conductive pads 1584 may be operably coupled to at least one of the conductive pads 1582 that are configured to receive VSS from the computer interface board 1410. Of course, in some embodiments, the conductive pads 1584 may be operably coupled to conductive pads 1582 that are configured to receive VDD from the computer interface board 1410.

When the electronic device 1520 is inserted into the DIMM socket 1416 while the computer interface board 1410 is operating, power (VSS) is received by some of the conductive pads 1582 when they contact the mating conductors of the DIMM socket 1416. VSS may be applied to the conductive pads 1584 and transmitted back to the computer interface board 1410 as the presence detect signals 1452-1, 1452-2. The electronic device 1520 may also transmit the protocol indicator 1428 to the computer interface board 1410.

Using the presence detect signals 1452-1, 1452-2, and the protocol indicator 1428, the computer interface board 1410 may detect the insertion, and determine if the computer interface board 1410 is capable of supporting hot insertion of the electronic device 1520. If the computer interface board 1410 supports hot insertion of the electronic device 1520, the computer interface board 1410 may isolate its control circuitry from the electronic device 1520 until the electronic device 1520 is properly seated into the DIMM socket 1416. By way of non-limiting example, the computer interface board 1410 may isolate its control circuitry from the electronic device 1520 for a predetermined amount of time (e.g., 1 second). After the predetermined amount of time, the computer interface board 1410 may couple its control circuitry to the electronic device 1520 and interact with the electronic device 1520 using the communication protocol indicated by the protocol indicator 1428. If the computer interface board 1410 is not capable of hot insertion of the electronic device 1520, the computer interface board 1410 may couple its control circuitry to the electronic device 1520.

In some embodiments, the conductive pads 1584 that deliver the presence detect signals 1452-1, 1452-2 to the computer interface board 1410 may be slightly modified so that they make contact slightly later than standard conductive pads 1582 on insertion, and break contact slightly earlier on removal. By way of non-limiting example, the conductive pads 1584 may be located slightly further away from the leading edge 1576 than the other conductive pads 1582.

In some embodiments, an electronic device may include a mating connector configured to interface with an electrical connector of another electronic device. The mating connector may be configured to interface with the electrical connector. The mating connector may include one or more pins configured to output a presence detect signal to the other electronic device through the electrical connector to enable the other electronic device to detect the electronic device. In some embodiments, the one or more pins may be configured to contact mating pins of the electrical connector after other pins of the mating connector contact other mating pins of the electrical connector. In some embodiments, two of the one or more pins are located at opposite sides of the mating connector.

Figure 16:
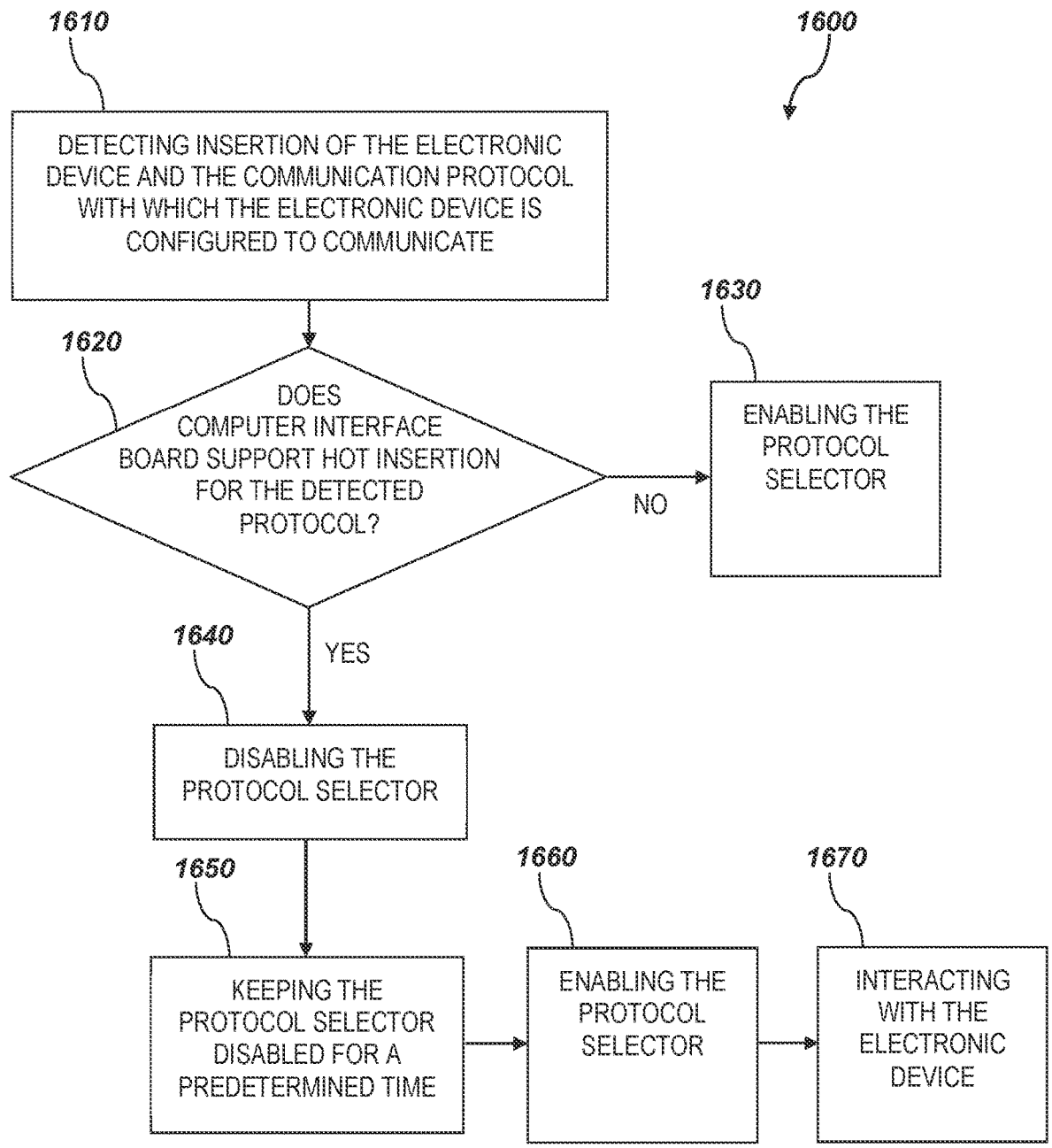
FIG. 16 is a flowchart illustrating a method of enabling insertion of an electronic device into a memory socket of a computer interface board during operation of the computer interface board.

FIG. 16 is a flowchart 1600 illustrating a method of enabling insertion of an electronic device 1520 (FIGS. 15A and 15B) into a memory socket 1316, 1416 of a computer interface board 1310, 1410 during operation of the computer interface board 1310, 1410 (FIGS. 13 and 14). Referring to FIGS. 13 through 16 together, at operation 1610 the method may include detecting insertion of the electronic device 1520 and the communication protocol with which the electronic device 1520 is configured to communicate. In some embodiments, detecting insertion of the electronic device 1520 may include receiving a presence detect signal 1352, 1452-1, 1452-2 from the electronic device 1520 responsive to insertion of the electronic device into the memory socket 1316, 1416. In some embodiments, detecting insertion of the electronic device 1520 may include detecting a change in a voltage of the presence detect signal. Also, in some embodiments, detecting the communication protocol with which the electronic device 1520 is configured to communicate may include receiving a protocol indicator 1328, 1428 indicating the communication protocol from the electronic device 1520.

At decision 1620, the method may include determining whether the computer interface board 1310, 1410 supports hot insertion for the detected communication protocol. In some embodiments, the computer interface board 1310, 1410 may not support hot insertion for memory protocols. In some embodiments, the computer interface board 1310, 1410 may support hot insertion for memory protocols. In some embodiments, the computer interface board 1310, 1410 may support hot insertion for storage protocols (e.g., SATA, PCIe, SAS, etc.).

If the computer interface board 1310, 1410 does not support hot insertion for the detected communication protocol, at operation 1630 the method may include enabling a protocol selector 1314, 1414 of the computer interface board 1310, 1410. In some embodiments, enabling the protocol selector 1314, 1414 may include operably coupling one of a memory bus 1418-1, a PCIe bus 1418-2, a SATA bus 1418-N and any other bus to the memory socket 1316, 1416. In some embodiments, enabling the protocol selector 1314 may include enabling a protocol selector module configured to enable a communication module of the computer interface board 1310 that corresponds to the detected communication protocol.

Returning to decision 1620, if the computer interface board 1310, 1410 supports hot insertion for the detected communication protocol, at operation 1640, the method may include disabling the protocol selector 1314, 1414 of the computer interface board 1310, 1410. In some embodiments, disabling the protocol selector 1314, 1414 may include isolating the memory socket 1316, 1416 from the memory bus 1418-1, the PCIe bus 1418-2, the SATA bus 1418-N and any other bus. In some embodiments, disabling the protocol selector 1314 may include disabling a protocol selector module configured to enable a communication module of the computer interface board 1310 that corresponds to the detected communication protocol.

At operation 1650, the method may include keeping the protocol selector 1314, 1414 disabled for a predetermined time. In some embodiments, keeping the protocol selector 1314, 1414 disabled for a predetermined time may include keeping the protocol selector 1314, 1414 disabled for about one second. In some embodiments, keeping the protocol selector 1314, 1414 disabled for a predetermined time may include keeping the protocol selector 1314, 1414 disabled until the electronic device 1520 is properly seated in the memory socket 1316, 1416.

At operation 1660, the method may include enabling the protocol selector 1314, 1414 after the predetermined time. At operation 1670, the method may include interacting with the electronic device 1520.

In some embodiments, a method may include receiving another electronic device into a memory socket of an electronic device while the electronic device is operating. The method may also include operating the other electronic device without powering down the electronic device. In some embodiments, receiving the other electronic device into the memory socket while the electronic device is operating includes detecting an insertion of the other electronic device into the memory socket, disabling communication between the electronic device and the other electronic device for a predetermined time, and enabling communication between the electronic device and the other electronic device after the predetermined time is over.

In some embodiments, detecting the insertion of the other electronic device into the memory socket comprises receiving one or more presence detect signals from the other electronic device. Also, in some embodiments, disabling communication between the electronic device and the other electronic device comprises electrically isolating the memory socket from the communication buses of the electronic device.

In some embodiments, receiving one or more presence detect signals from the other electronic device includes receiving at least a first presence detect signal near a first side of the memory socket, and receiving at least a second presence detect signal near a second side of the memory socket that is opposite the first side. Also, disabling communication between the electronic device and the other electronic device for the predetermined time may include keeping communication between the electronic device and the other electronic device disabled for the predetermined time after both the first presence detect signal and the second presence detect signal are received.

In some embodiments, disabling communication between the electronic device and the other electronic device may include disabling a protocol selector configured to enable the electronic device to communicate through the memory socket using the indicated communication protocol.

While certain illustrative embodiments have been described in connection with the figures, those of ordinary skill in the art will recognize and appreciate that embodiments encompassed by the disclosure are not limited to those embodiments explicitly shown and described herein. Rather, many additions, deletions, and modifications to the embodiments described herein may be made without departing from the scope of embodiments encompassed by the disclosure, such as those hereinafter claimed, including legal equivalents. In addition, features from one disclosed embodiment may be combined with features of another disclosed embodiment while still being encompassed within the scope of embodiments encompassed by the disclosure as contemplated by the inventors.

What is claimed is:

1. An apparatus, comprising:
   a memory connector;
   a memory bus;
   one or more communication buses;
   control circuitry operably coupled to the memory bus and the one or more communication buses, the control circuitry configured to communicate via the memory bus according to a memory protocol and via the one or more communication buses according to one or more communication protocols, the one or more communication protocols different from the memory protocol; and
   switching circuitry operably coupled to and between the memory connector and the memory bus and to and between the memory connector and the one or more communication buses, the switching circuitry configured to selectively operably couple each of the memory bus and the one or more communication buses to the memory connector to enable the control circuitry to selectively communicate through the memory connector using each of the memory protocol and the one or more communication protocols.

2. The apparatus of claim 1, wherein the memory connector comprises a dual-in-line memory module (DIMM) socket.

3. The apparatus of claim 1, wherein the one or more communication buses include a peripheral component interconnect express (PCIe) bus and a serial advanced technology attachment (SATA) bus.

4. The apparatus of claim 3, wherein the one or more communication buses further include at least one other communication bus.

5. The apparatus of claim 1, wherein the switching circuitry includes a multiplexer configured to selectively operably couple each of the memory bus and the one or more communication buses to the memory connector.

6. The apparatus of claim 5, wherein the switching circuitry is configured to selectively operably couple each of the memory bus and the one or more communication buses to the memory connector responsive to a protocol indicator received from an electronic device in electrical communication with the memory connector.

7. The apparatus of claim 6, wherein the switching circuitry is configured to receive the protocol indicator through the memory connector.

8. The apparatus of claim 6, wherein the control circuitry is configured to communicate through the memory connector using a protocol indicated by the protocol indicator.

9. An apparatus, comprising:
a memory connector;
a memory bus corresponding to a memory protocol;
one or more communication buses corresponding to one or more communication protocols, the one or more communication protocols different from the memory protocol; and
switching circuitry operably coupled to and between the memory connector and the memory bus and to and between the memory connector and the one or more communication buses, the switching circuitry configured to selectively operably couple each of the memory bus and the one or more communication buses to the memory connector to enable communication through the memory connector using each of the memory protocol and the one or more communication protocols.

10. The apparatus of claim 9, further comprising control circuitry operably coupled to the memory bus and the one or more communication buses, the control circuitry configured to communicate according to the memory protocol using the memory bus and according to the one or more communication protocols using the one or more communication buses.

11. The apparatus of claim 10, wherein the control circuitry includes a central processing unit (CPU) including:
memory circuitry configured to communicate according to the memory protocol using the memory bus; and
peripheral component interconnect express (PCIe) circuitry configured to communicate according to a PCIe protocol of the one or more communication protocols using a PCIe bus of the one or more communication buses.

12. The apparatus of claim 10, wherein the control circuitry includes a chipset including serial advanced technology attachment (SATA) circuitry configured to communicate according to a SATA protocol of the one or more communication protocols using a SATA bus of the one or more communication buses.

13. The apparatus of claim 10, wherein the control circuitry includes:
a central processing unit (CPU) including:
memory circuitry configured to communicate according to the memory protocol using the memory bus; and
peripheral component interconnect express (PCIe) circuitry configured to communicate according to a PCIe protocol of the one or more communication protocols using a PCIe bus of the one or more communication buses; and
a chipset including serial advanced technology attachment (SATA) circuitry configured to communicate according to a SATA protocol of the one or more communication protocols using a SATA bus of the one or more communication buses.

14. The apparatus of claim 9, wherein the memory protocol is a double data rate synchronous dynamic random access memory (DDR SDRAM) protocol.

15. The apparatus of claim 9, wherein the switching circuitry includes a multiplexer configured to selectively operably couple each of the memory bus and the one or more communication buses to the memory connector responsive to a protocol indicator received from an electronic device in electrical communication with the memory connector.

16. The apparatus of claim 15, further comprising an adjustable power supply configured to supply power to the electronic device in electrical communication with the memory connector, a voltage potential supplied by the adjustable power supply adjustable responsive to the protocol indicator.

17. The apparatus of claim 15, further comprising enable circuitry configured to:
receive a presence detect signal from the electronic device through the memory connector; and
detect the electrical communication of the electronic device with the memory connector responsive to the presence detect signal.

18. A method of operating an electrical system, the method comprising:
receiving a protocol indicator through a memory connector from an electronic device, the protocol indicator indicating one of a memory protocol or one or more communication protocols, the one or more communication protocols different from the memory protocol; and
selectively operably coupling, using switching circuitry operably coupled to and between the memory connector and a memory bus and to and between the memory connector and one or more communication buses, one of the memory bus or the one or more communication buses to the memory connector responsive to the protocol indicator, the memory bus corresponding to the memory protocol, the one or more communication buses corresponding to the one or more communication protocols, an operably coupled bus of the memory bus or the one or more communication buses corresponding to an indicated one of the memory protocol or the one or more communication protocols.

19. The method of claim 18, further comprising:
receiving a presence detect signal from the electronic device through the memory connector; and
detecting electrical communication of the electronic device with the memory connector responsive to the presence detect signal.

20. The method of claim 18, further comprising communicating with the electronic device through the operably coupled bus and the memory connector using the indicated one of the memory protocol or the one or more communication protocols.

* * * * *